US010191655B2

(12) United States Patent
Hong et al.

(10) Patent No.: US 10,191,655 B2
(45) Date of Patent: Jan. 29, 2019

(54) MOBILE TERMINAL AND METHOD FOR CONTROLLING THE SAME

(71) Applicant: LG ELECTRONICS INC., Seoul (KR)

(72) Inventors: Jihee Hong, Seoul (KR); Hyemi Jung, Seoul (KR); Heonjae Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 192 days.

(21) Appl. No.: 15/040,833

(22) Filed: Feb. 10, 2016

(65) Prior Publication Data

US 2017/0068447 A1 Mar. 9, 2017

(30) Foreign Application Priority Data

Sep. 4, 2015 (KR) .......................... 10-2015-0125820

(51) Int. Cl.
*G06F 3/0488* (2013.01)
*G06F 3/0481* (2013.01)
(Continued)

(52) U.S. Cl.
CPC ........ *G06F 3/04886* (2013.01); *G06F 3/0482* (2013.01); *G06F 3/0488* (2013.01);
(Continued)

(58) Field of Classification Search
CPC .................. G06F 3/04886; G09G 5/14; G09G 2320/0626; H04B 1/3833
See application file for complete search history.

(56) References Cited

U.S. PATENT DOCUMENTS 8,443,297 B1* 5/2013 Jitkoff .................. G06F 3/0481
715/790
2006/0087502 A1* 4/2006 Karidis ................. G06F 1/3203
345/211
(Continued)

FOREIGN PATENT DOCUMENTS

KR 10-2013-0070157 6/2013
KR 10-2014-0078914 6/2014
KR 10-2015-0006221 1/2015
KR 10-2015-0065543 6/2015

OTHER PUBLICATIONS

International Search Report and Written Opinion issued in International Application No. PCT/KR2016/002085, dated Jun. 22, 2016, 13 pages.

*Primary Examiner* — Omar R Abdul-Ali
(74) *Attorney, Agent, or Firm* — Lee, Hong, Degerman, Kang & Waimey

(57) ABSTRACT

The present disclosure relates to a mobile terminal having a display unit consisting of a plurality of regions, and a control method thereof. A mobile terminal, according to the present disclosure may include a body having a front surface, a lateral surface and a rear surface; a display unit comprising a first region disposed on the front surface and a second region extended and formed in at least one direction of the first region; and a controller configured to independently control the switching of the first region and the second region to an active (on) state or inactive (off) state with respect to the first region and the second region, respectively, based on the occurrence of a predetermined event, wherein the controller independently controls brightness during an active state with respect to the first region and the second region, respectively, based on the occurrence of a predetermined event.

20 Claims, 19 Drawing Sheets

(51) Int. Cl.
*G06F 3/0482* (2013.01)
*G06F 3/0484* (2013.01)
*G09G 5/14* (2006.01)
*H04B 1/3827* (2015.01)
*G09G 3/34* (2006.01)

(52) U.S. Cl.
CPC ...... *G06F 3/04817* (2013.01); *G06F 3/04842* (2013.01); *G06F 3/04883* (2013.01); *G09G 3/342* (2013.01); *G09G 5/14* (2013.01); *H04B 1/3833* (2013.01); *G06F 2203/04803* (2013.01); *G09G 2320/0626* (2013.01); *G09G 2320/0646* (2013.01); *G09G 2320/0686* (2013.01); *G09G 2330/023* (2013.01); *G09G 2340/145* (2013.01)

(56) References Cited

U.S. PATENT DOCUMENTS

| | | | |
|---|---|---|---|
| 2011/0258566 A1* | 10/2011 | Oustiougov | G06F 3/0483 715/766 |
| 2012/0270606 A1 | 10/2012 | Kim et al. | |
| 2013/0117698 A1* | 5/2013 | Park | G06F 3/04817 715/765 |
| 2014/0059460 A1* | 2/2014 | Ho | G06F 3/048 715/766 |
| 2014/0164941 A1* | 6/2014 | Kim | G06F 21/36 715/741 |
| 2014/0331174 A1* | 11/2014 | Wen | G06F 3/0481 715/804 |
| 2015/0135080 A1* | 5/2015 | Ji | G06F 3/0416 715/728 |

\* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2015-0125820, filed on Sep. 4, 2015, the contents of which are hereby incorporated by reference herein in their entireties.

BACKGROUND OF THE INVENTION

1. Field of the Invention

The present disclosure relates to a mobile terminal having a display unit consisting of a plurality of regions, and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Due to the functional support and improvement of mobile terminals and the enhancement of multimedia functions, the size of the display unit has increased and the image quality has also increased to have high-resolution, thereby requiring a lot of power consumption to drive the display unit of the mobile terminal.

In general, when the display unit is activated, the entire screen thereof may be activated to consume substantially constant power all the time. Accordingly, there is a drawback of increasing the power consumption of a battery as increasing the active period of time.

Furthermore, the brightness of the display unit may be adjusted as a whole, thereby resulting in unnecessary power consumption.

SUMMARY OF THE INVENTION

An object of the present disclosure is to solve the foregoing problems and other problems. Another object of the present disclosure is to provide a mobile terminal and a control method capable of independently activating part of the display unit to reduce power consumption according to a user's need.

Still another object of the present disclosure is to provide a mobile terminal and a control method capable of selectively activating and operating a partial region on a single display unit consisting of a main region and an extended region.

Yet still another object of the present disclosure is to provide a mobile terminal and a control method capable of independently controlling the brightness of the main region and extended region.

In order to accomplish the foregoing objectives, according to an aspect of the present disclosure, there is provided a mobile terminal, including a body having a front surface, a lateral surface and a rear surface; a display unit comprising a first region disposed on the front surface and a second region extended and formed in at least one direction of the first region; and a controller configured to independently control the switching of the first region and the second region to an active (on) state or inactive (off) state with respect to the first region and the second region, respectively, based on the occurrence of a predetermined event, wherein the controller independently controls brightness during an active state with respect to the first region and the second region, respectively, based on the occurrence of a predetermined event.

According to an embodiment, the controller may display a screen for lock release in at least one region of the first region and the second region based on a predetermined touch applied to at least one region of the first region and the second region when the first region and the second region are in an inactive state.

According to another embodiment, the controller may display a screen for lock release in the first region based on a consecutively knocking touch input applied to the first region within a predetermined period of time when the first region and the second region are in an inactive state.

According to another embodiment, the controller may display a screen for controlling an application being executed in the second region based on a predetermined touch input applied to the first region when the first region and the second region are in an inactive state.

According to another embodiment, when one region of the first region and the second region is in an inactive state and the remaining region is in an active state, the controller may switch an inactive state of the region to an active state based on a predetermined touch input applied to the region in the inactive state.

According to another embodiment, the controller may switch a region set to be preferentially changed by a user on the first region and the second region to an active state based on a consecutively knocking touch input applied to at least one region of the first region and the second region within a predetermined period of time when the first region and the second region are in an inactive state, and switch the remaining region in an inactive state to an active state based on a consecutively knocking touch input applied again to at least one region of the first region and the second region within a predetermined period of time.

According to another embodiment, the controller may switch a region set to be preferentially changed by a user on the first region and the second region to an inactive state based on a user input not being applied within a predetermined period of time when the first region and the second region are in an active state, and switch the remaining region in an active state to an inactive state based on a user input not being applied within a predetermined period of time.

According to another embodiment, the controller may decrease the brightness of the first region to a predetermined level and increase the brightness of the second region to a predetermined level based on a touch input for controlling the execution of an application applied to the second region in a state that an execution screen of the application is displayed in the first region and a screen for controlling the execution of the application is displayed in the second region.

According to another embodiment, the controller may display an execution screen of a predetermined application in the first region in which the brightness is increased to a predetermined level, and display a screen for controlling the execution of the predetermined application in the second region in which the brightness is decreased to a predetermined level based on the application of a user input for executing the predetermined application.

According to another embodiment, the controller may increase the brightness of the second region to a predetermined level based on a touch input for controlling the execution of the predetermined application applied to the second region.

According to another embodiment, the controller may display an execution screen of an application corresponding to an icon to which a predetermined touch input is applied in the first region based on the touch input applied to one of icons corresponding to a plurality of applications displayed in the second region.

According to another embodiment, the controller may adjust the brightness of the first region to a brightness at a predetermined level in response to the executed application.

Furthermore, according to another aspect of the present disclosure, there is provided a control method of a mobile terminal, and the method may include (a) independently controlling the switching of a first region and a second region extended and formed in at least one direction of the first region on a display unit to an active (on) state or inactive (off) state with respect to the first region and the second region, respectively, based on the occurrence of a predetermined event; and (b) independently controlling brightness during an active state with respect to the first region and the second region, respectively, based on the occurrence of a predetermined event.

According to an embodiment, the step (a) may include displaying a screen for lock release in the first region based on a consecutively knocking touch input applied to the first region within a predetermined period of time when the first region and the second region are in an inactive state.

According to another embodiment, the step (a) may include displaying a screen for controlling an application being executed in the second region based on a predetermined touch input applied to the first region when the first region and the second region are in an inactive state.

According to another embodiment, the step (a) may include switching an inactive state of the region to an active state based on a predetermined touch input applied to the region in the inactive state when one region of the first region and the second region is in an inactive state and the remaining region is in an active state.

According to another embodiment, the step (b) may include decreasing the brightness of the first region to a predetermined level and increasing the brightness of the second region to a predetermined level based on a touch input for controlling the execution of an application applied to the second region in a state that an execution screen of the application is displayed in the first region and a screen for controlling the execution of the application is displayed in the second region.

According to another embodiment, the step (b) may include displaying an execution screen of a predetermined application in the first region in which the brightness is increased to a predetermined level, and displaying a screen for controlling the execution of the predetermined application in the second region in which the brightness is decreased to a predetermined level based on the application of a user input for executing the predetermined application.

According to another embodiment, the step (b) may include displaying an execution screen of an application corresponding to an icon to which a predetermined touch input is applied in the first region based on the touch input applied to one of icons corresponding to a plurality of applications displayed in the second region.

According to another embodiment, the step (b) may include adjusting the brightness of the first region to a brightness at a predetermined level in response to the executed application.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
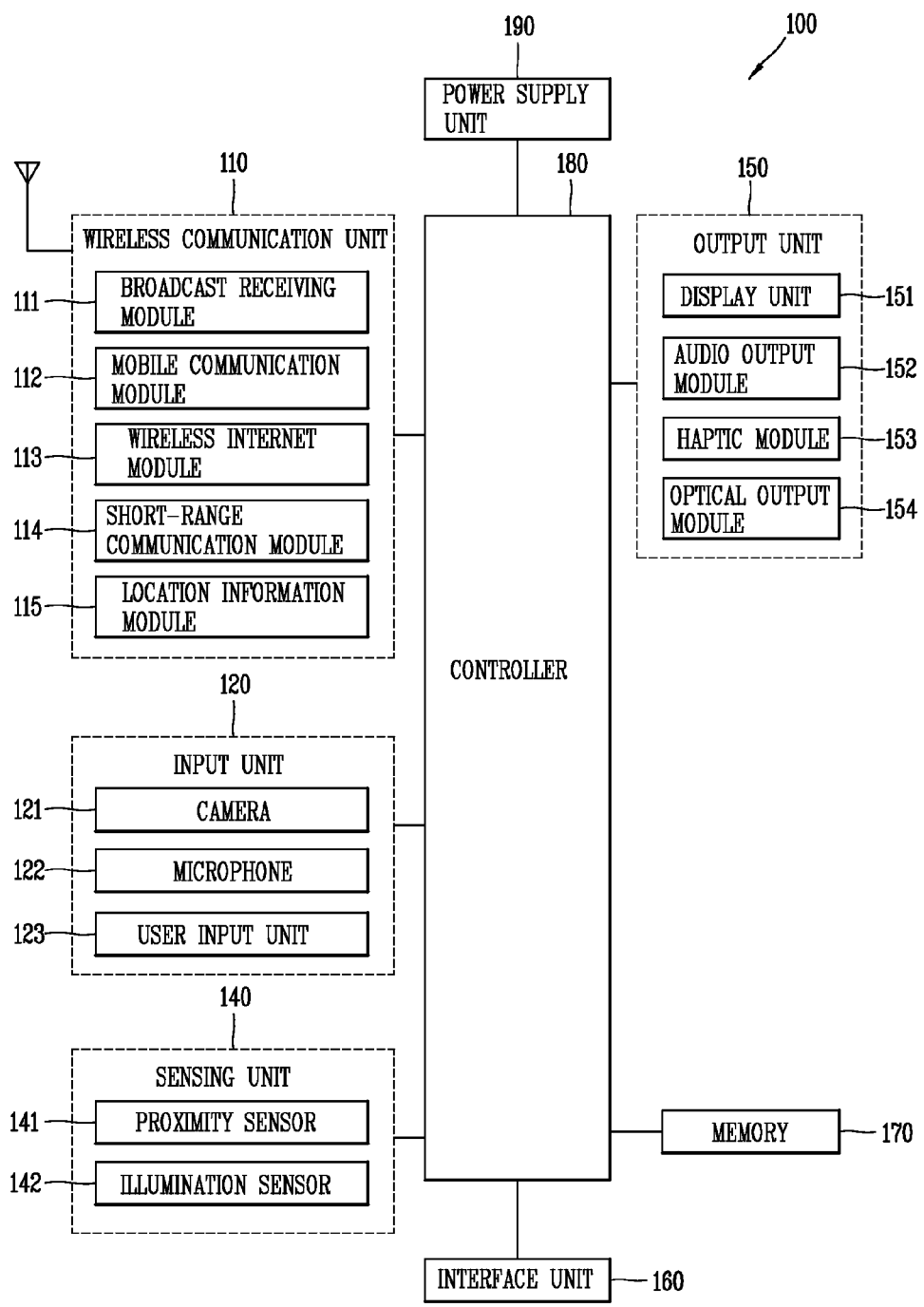
FIG. 1A is a block diagram for explaining a mobile terminal associated with the present disclosure.
Figure 1B:
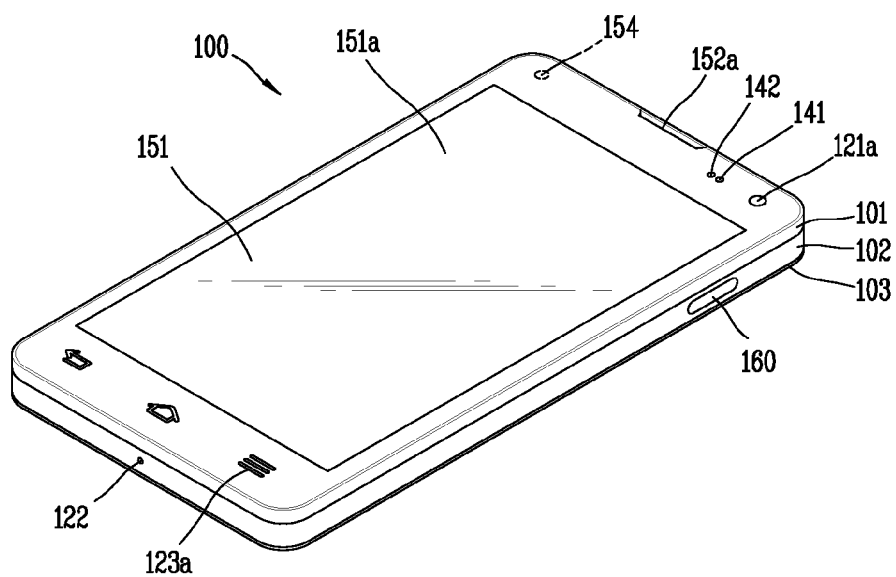
FIGS. 1B and 1C are conceptual views illustrating an example in which a mobile terminal associated with the present disclosure is seen from different directions.
Figure 1C:
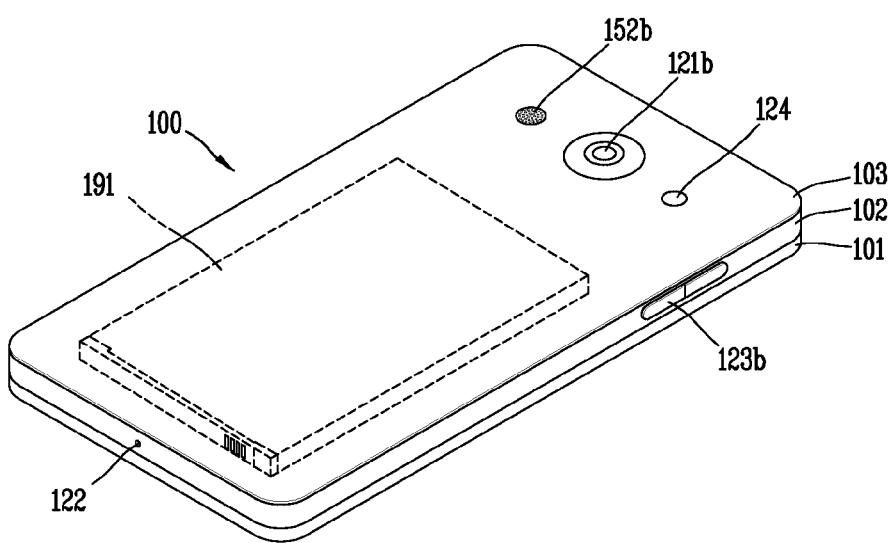

Referring to FIGS. 1A through 1C, FIG. 1A is a block diagram of a mobile terminal in accordance with the present disclosure, FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

On the other hand, the touch sensor may be formed to sense a touch input using a different scheme in an active or inactive state of the display unit 151. At this time, the different scheme may be associated with an active period of the touch sensor. More specifically, the touch sensor may be activated with a different period according to whether or not the display unit 151 is activated. In other words, the touch sensor may have a different active period according to whether or not the display unit 151 is activated to sense a touch input applied to the touch sensor.

For example, when the display unit 151 is in an inactive state, the touch sensor may be activated with a preset specific period. In this case, the specific period may be a period corresponding to a time greater than zero. Furthermore, when the display unit 151 is in an active state, the touch sensor may be always operated in an active state. In other words, in this case, an activated period of the touch sensor may be a period having a time zero or very close to zero.

Whether or not the touch sensor is activated may be determined using the power consumption of the touch sensor. For example, the touch sensor may correspond to an inactive state when the power consumption of the touch sensor is less than a preset reference value based on zero, and may be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor may be activated for each a preset specific period.

On the other hand, as reducing a specific period in which the touch sensor is activated, a speed for sensing a touch input hitting the display unit 151 may increase, but accordingly power consumed by the touch sensor may also increase. On the contrary, as increasing the period in which the touch sensor is activated, a speed for sensing a touch input hitting the display unit 151 may decrease though power consumed by the touch sensor decreases.

Accordingly, the specific period may be set to enhance the efficiency of power consumption while the sensing speed is fast enough to the extent that cannot be recognized by the user in sensing a touch input hitting the display unit 151. For example, the specific period may be set such that the touch sensor is inactive and then active 20 times (Hz) per second.

On the other hand, while the display unit 151 is in an active state, the touch sensor may be also activated, and the active period (T) in an active state may be zero or very close to zero. Otherwise, the period of the touch sensor while the touch sensor is in an active state may be shorter several times than a specific period set to activate the touch sensor while the display unit 151 is in an inactive state.

On the other hand, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 may switch the doze mode to an active mode in which the display unit and touch sensor are activated.

In addition, the touch sensor may be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

For another embodiment, a plurality of cameras may be disposed on a front surface. Specifically, a dual camera may be disposed on a front surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

For another embodiment, a plurality of cameras may be disposed on a rear surface. Specifically, a dual camera may be disposed on a rear surface of the terminal body.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, a communication system which is operable with the mobile terminal 100 according to the present disclosure will be described.

First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings apply equally to other system types including a CDMA wireless communication system.

A CDMA wireless communication system includes one or more mobile terminals 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100 may cooperate with the CDMA wireless communication system. Such satellites 300 facilitate locating the position of the mobile terminal 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

A location information module 115 of the mobile terminal is configured to acquire a position of the mobile terminal. Such location information module 115 may include a Global Position System (GPS) module and a Wireless Fidelity (Wi-Fi) module. According to the need, the location information module 115 may perform any function of another module of the wireless communication unit 110 to obtain data for the location of the mobile terminal in a substitutional or additional manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module.

The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, Service Set IDentification (SSID), Received Signal Strength Indicator (RSSI), Reference Signal Received Power (RSRP), Reference Signal Received Quality (RSRQ), channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. Information included therein is compared with the received wireless AP information to extract (analyze) the location information of the mobile terminal 100.

A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter.

Besides the above methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

As aforementioned with reference to FIG. 1A, a short-range communication technique, such as Bluetooth™, Radio Frequency Identification (RFID), Infrared Data Association (IrDA), Ultra Wideband (UWB), ZigBee and Near Field Communication (NFC), may be applicable to the mobile terminal according to the present invention.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The security module may be a physical medium such as UICC (Universal Integrated Circuit Card) (e.g., SIM (Subscriber Identification Module) or USIM (Universal SIM)), a secure micro SD and a sticker, or a logical medium (e.g., embedded SE (Secure Element)) embedded in the mobile terminal. SWP (Single Wire Protocol)-based data exchange may be performed between the NFC module and the security module.

In a case where the NFC module operates in a card mode, the mobile terminal may transmit card information on a general IC card to outside. More specifically, if a mobile terminal having therein card information on a payment card (e. g, a credit card or a bus card) is made to approach to a card reader, a short-range mobile payment may be executed. On the other hand, if a mobile terminal which stores card information on an entrance card is made to approach to an entrance card reader, an entrance approval procedure may start. A card such as a credit card, a traffic card and an entrance card may be mounted in the security module in the form of applet, and the security module may store card information on the card mounted therein. Card information of a payment card may be at least one of a card number, a remaining amount and a usage history. Card information of an entrance card may be at least one of a user's name, a user's number (e.g., undergraduate number or staff number) and an entrance history.

In a case where the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In a case where the NFC module operates in a peer-to-peer (P2P) mode, the mobile terminal may execute P2P communication with another mobile terminal. In this case, LLCP (Logical Link Control Protocol) may be applied to the P2P communication. For the P2P communication, connection may be generated between the mobile terminal and said another mobile terminal. The connection may be categorized into a connectionless mode which ends after one packet is switched, and a connection-oriented mode in which packets are switched consecutively. For the P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is short.

Figure 2:
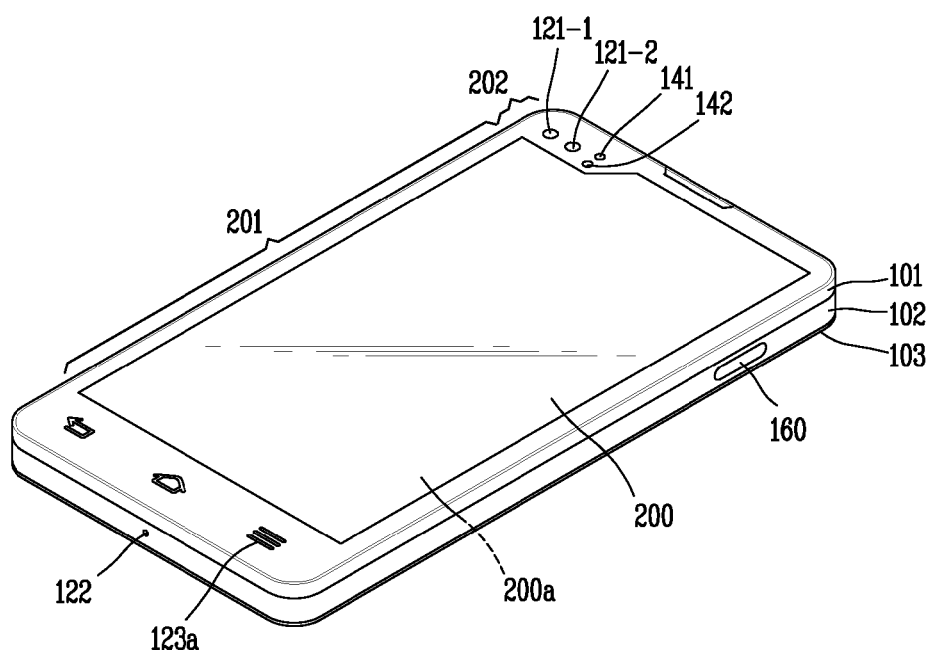
FIG. 2 is a conceptual view in which a mobile terminal applicable to the present disclosure is seen from a front side.

FIG. 2 is a conceptual view in which a mobile terminal applicable to the present disclosure is seen from a front side.

As illustrated in FIG. 2, a mobile terminal according to the present disclosure is provided with at least one or more display regions independently activated (implemented) within a single display unit (or display panel) 200 to form a window 200a. In the aspect of independently activating/deactivating a partial region thereof, the display unit 200 has a different structure from that of the display unit 151 in which the entire region thereof is activated/deactivated at the same time.

In other words, the display unit 200 has a structure in which one side thereof illustrated in FIG. 1B is extended in a predetermined direction, for example, in an upward direction. Though only an example in which one side thereof is extended in an upward direction is disclosed in FIG. 2, for the sake of convenience of explanation, the present disclosure may not be necessarily limited to this, and may be also extended in a horizontal, lateral or downward direction.

A first region 201 on the display unit 200 as a main region corresponds to the display unit 151 in FIG. 1B, and a second region 202 corresponds to an extended region. The two regions 201, 202 may be independently controlled by the controller 180. The extended region 202 may have a different shape and size from that of the main region 201.

Accordingly, according to the circumstances, the present disclosure may selectively activate one of the two regions 201, 202, thereby reducing power consumption.

Typical image information may be displayed in the main region 201, and an event occurrence may be displayed or a status bar may be displayed in the extended region 202, and additional information may be displayed therein according to the type of an application displayed in the main region 201. In particular, status information may be displayed in the extended region when the main region 201 is in an inactive state (off state), and the status information may be displayed at an upper portion of the main region when the main region 201 is in an active state (on state).

Accordingly, when it is controlled that the main region 201 is deactivated and the extended region 202 is activated in a state that a user does not use the terminal, the user may check a status or newly occurred event of the mobile terminal through the extended region 202.

The extended region 202 may be formed to be less than or equal to a horizontal or vertical length of the main region 201 as illustrated in the drawing. According to the present disclosure, an example is given that a horizontal length of the extended region 202 is less than a horizontal length of the main region 201.

In this case, the camera 121, proximity sensor 141 and illumination sensor 142 that have been located an upper side of the display unit 151 in FIG. 1B may be disposed at the left side of the extended region 202 as illustrated in FIG. 2.

As described above, a plurality of cameras may be disposed on a front or rear surface of the terminal body. Specifically, a dual camera 121-1, 121-2 may be disposed on a front or rear surface of the terminal body.

When a horizontal length of the extended region 202 is formed to be less than that of the main region 201, at least one side thereof may be formed in one of a rectangular shape, an inclined surface and a curved surface. In FIG. 2, one side thereof forms an inclined surface.

The display unit 200 as a display panel is largely divided into a liquid crystal panel and a backlight unit. The backlight unit plays the role of uniformly providing light provided from a light source in a front direction of the display unit 200, and includes the light source, a light guide plate, a polarizing plate, a diffusion plate, and a reflection plate.

Figure 3A:
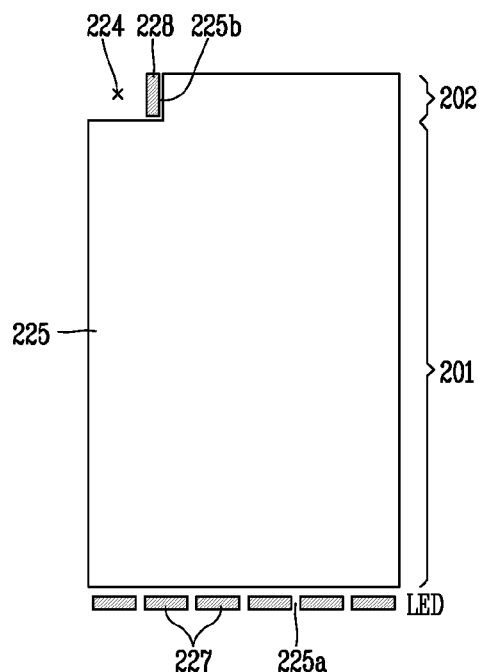
FIGS. 3A and 3B are front views illustrating a light guide plate and a light source constituting a display unit according to the present disclosure.
Figure 3B:
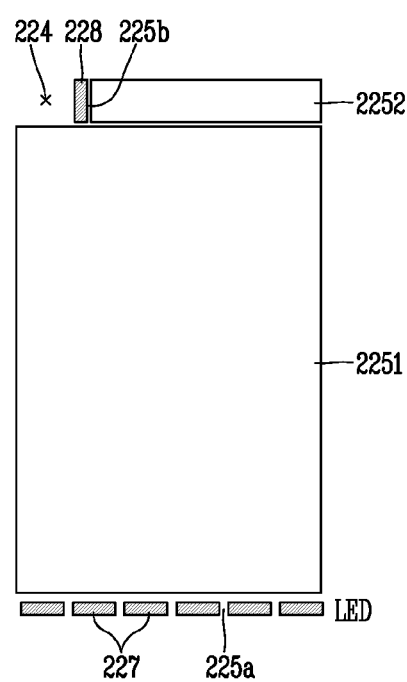

FIGS. 3A and 3B are front views illustrating a light guide plate and a light source constituting a display unit 200 according to the present disclosure.

As illustrated in FIG. 3A, light sources 227, 228 are disposed at a lateral surface of the light guide plate 225 to supply light to a lateral surface of the light guide plate 225, and the light guide plate 225 diffuses light supplied from the light sources 227, 228 using a total reflection property within the light guide plate 225. Total reflection is a property of emitting light from the light guide plate 225 only when light incident to the lateral surface is entered above a critical angle, wherein light incident to a lateral surface is entered above a critical angle and totally reflected and diffused within the light guide plate 225 and emitted from the light guide plate 225 when bent at an angle within the critical angle. Here, the main light source 227, the auxiliary light source 228 and the light guide plate 225 are illustrated in the drawing.

The backlight unit supplies light to the light guide plate 225 through light sources located in two directions contrary to the related art. For example, a plurality of main light sources 227 disposed in parallel along a first lateral surface 225a of the light guide plate 225 may uniformly supply light over the entire light guide plate 225. The auxiliary light source 228 located at a second lateral surface 225b perpendicular to the first lateral surface 225a of the light guide plate 225 may supply light to part of the light guide plate 225.

The main light source 227 and auxiliary light source 228 may be independently driven to control that only the auxiliary light source 228 is turned on in a state that the main light source 227 is turned off.

Figure 4:
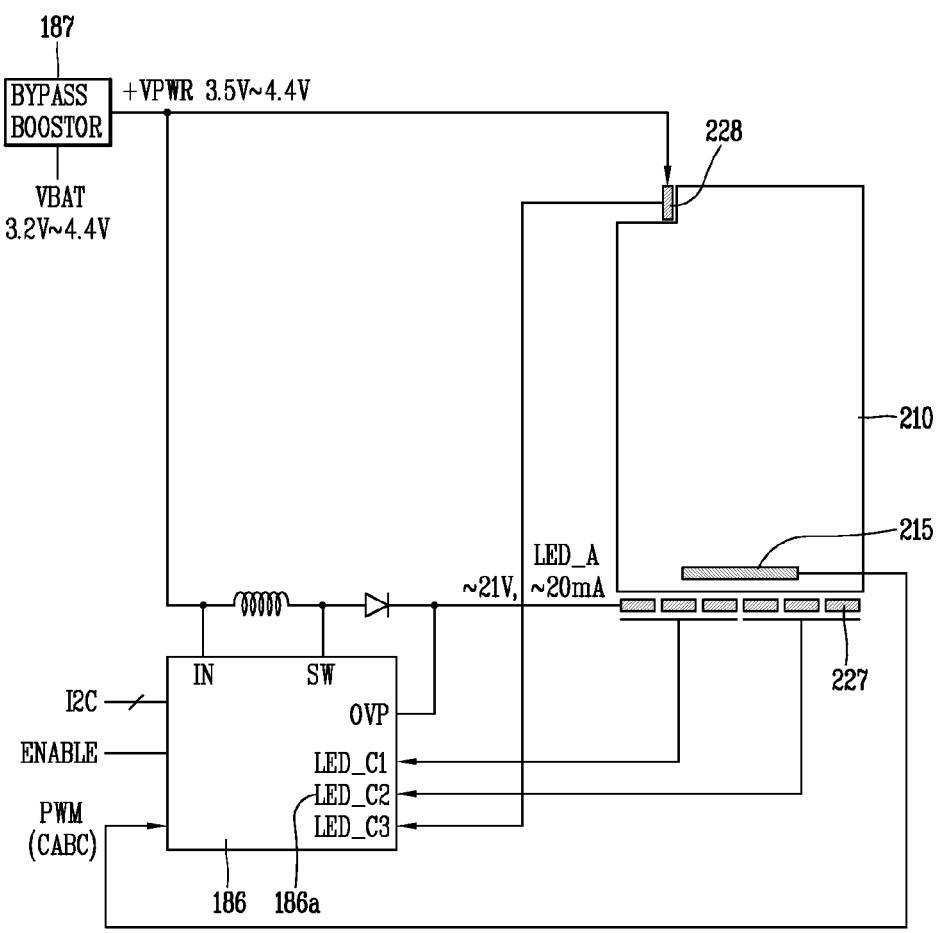
FIGS. 4 and 5 are an IC circuit for controlling a main light source and an auxiliary light source.
Figure 5:
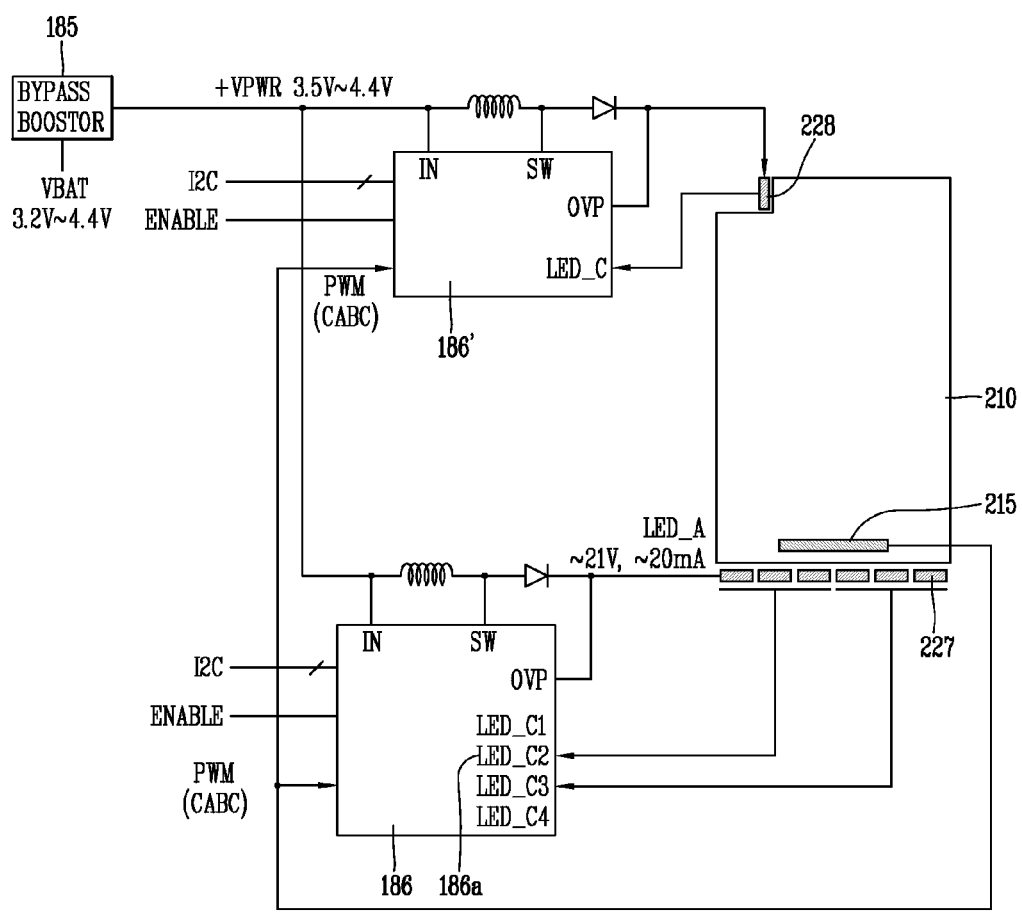

FIGS. 4 and 5 are an IC circuit for controlling the main light source 227 and auxiliary light source 228.

An IC circuit illustrated in FIG. 4 is configured in such a manner that one backlight IC 186 controls the main light source 227 and auxiliary light source 228, and an IC circuit illustrated in FIG. 4 is configured in such a manner that two backlight ICs 186 controls the main light source 227 and auxiliary light source 228, respectively.

A power source (VBAT) supplied from the power supply unit 190 is noise-removed through a bypass booster 187 and input to the backlight IC 186. The backlight IC 186 controls the light sources 227, 228 to emit light. The backlight IC 186 finds an optimal backlight brightness for displaying the relevant image based on the low data information of an image received from a drive IC 215 of the liquid crystal panel to adjust the brightness of each LED (Content Adaptive Brightness Control (CABC)).

When one backlight IC 186 is used, the present disclosure may use one more LED channel 186a to control the auxiliary light source 228 (FIG. 4), and further include an additional backlight IC 186' to separately control the auxiliary light source 228 (FIG. 5).

The plurality of main light sources 227 may be provided in parallel adjacent to the first lateral surface 225a to supply light to the entire light guide plate 225, but one or two auxiliary light sources 228 having a smaller number than that of the main light sources 227 may be provided to supply light only to part of the light guide plate 225.

The present disclosure may include a first light guide plate 2251 configured to emit light supplied from the main light source 227 to a front surface of the display unit 200 and a second light guide plate 2252 configured to emit light supplied from the auxiliary light source 228 to a front surface of the display unit 200 as illustrated in FIG. 3B.

When the light guide plate 225 is configured as an integral type as illustrated in FIG. 3A, the main light source 227 may supply light to the second region 202 as well as the first region 201. As a result, it has an advantage in which when the main light source 227 is turned on, the auxiliary light source 228 is not required to be turned on, and an image may be displayed over the second region 202 and first region 201.

On the other hand, when the light guide plate 225 is configured as a separable type as illustrated in FIG. 3B, the light of the main light source 227 is supplied only to the first region 201 through the first light guide plate 2251, and the light of the auxiliary light source 228 is supplied only to the second region 202 through the second light guide plate 2252. The auxiliary light source 228 should be driven to display information in the second region 202 even in a state that the main light source 227 is turned on, but light is not supplied to the first region 201 when information is displayed only in the second region 202, and thus an image with a high brightness may be provided using a smaller number of light sources (LED lamps).

The main light source 227 and auxiliary light source 228 may be connected to a main board in a merged manner or individually connected to the main board in a separate manner. Accordingly, according to the present disclosure, independently controlling the main region 201 and extended region 202 denotes that the controller 180 independently controls the main light source 227 and auxiliary light source 228.

The auxiliary light source 228 may be located at the second lateral surface 225b, thereby increasing the size of a bezel of the second lateral surface 225b. An increase of the bezel size due to the auxiliary light source 228 may not be a big problem in case of a large-sized display unit, but the bezel size may be a very important factor in determining the size of the entire product in a small-sized terminal.

Accordingly, according to the present disclosure, in order to prevent an increase of the bezel size in a lateral direction, the second lateral surface 225b of the light guide plate 225 at which the auxiliary light source 228 is located may be formed in a concave manner to form a dent 224. The auxiliary light source 228 may be located at the dent 224, thereby preventing the bezel size from being increased in a lateral direction.

On the other hand, an liquid crystal panel 210 constituting the display unit 200 has a similar size to that of the light guide plate 225. In other words, when the light guide plate 225 has a dent 224, the dent is formed on the same location.

According to the present disclosure, the light guide plate 225 may be divided into a portion corresponding to the main region 201 and a portion corresponding to the extended region 202, but the liquid crystal panel is provided with one unit and controlled by one drive IC. The drive IC is connected to a main board through a flexible board to apply power for each pixel according to an image signal received from the main board so as to adjust the alignment of liquid crystal molecules.

The liquid crystal panel is a device of selectively applying power for each pixel to change the alignment of liquid crystal molecules and display a different color for each pixel, thereby configuring an image. The display unit 200 configured with such a liquid crystal panel and a backlight unit may be disposed on a front surface of the mobile terminal 100 to display information according to the control of the controller 180 as illustrated in FIG. 2.

Figure 6:
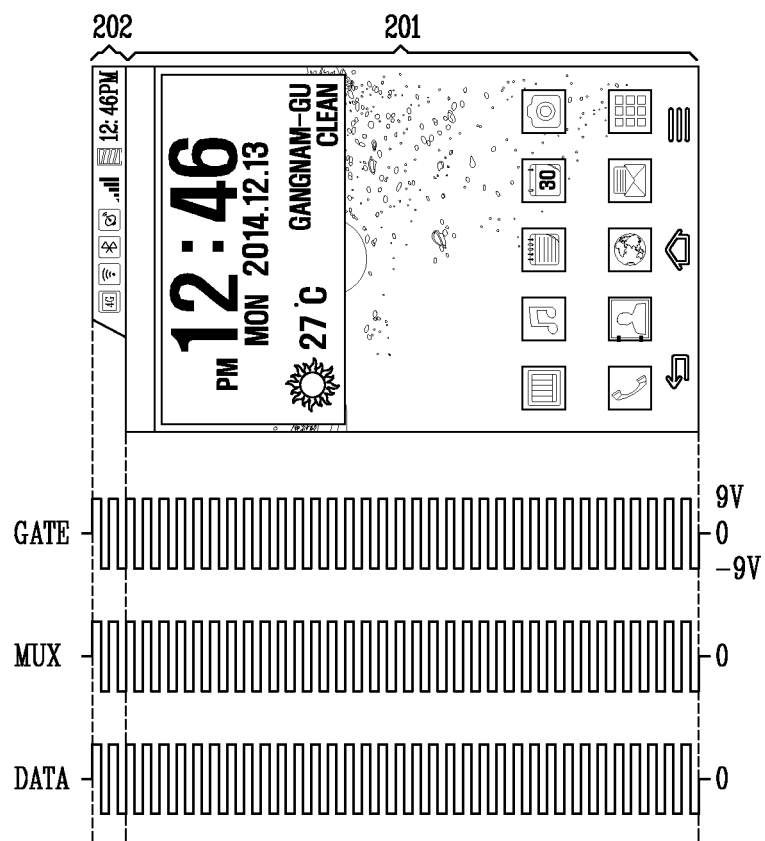
FIGS. 6 and 7 are views illustrating the waveforms of signals applied to an liquid crystal panel of a mobile terminal according to the present disclosure.
Figure 7:
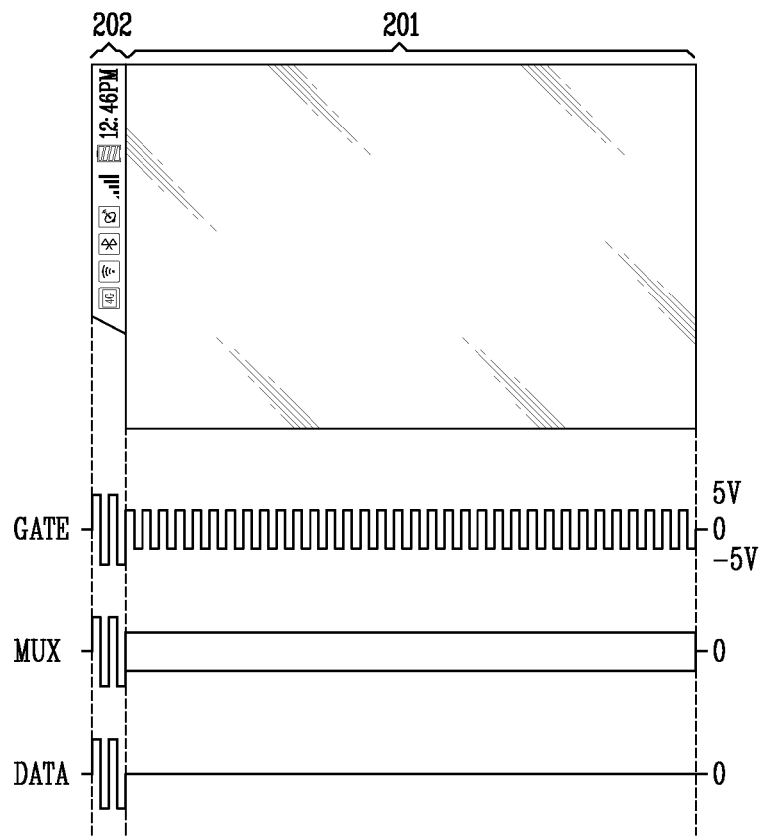

FIGS. 6 and 7 are views illustrating the waveforms of signals applied to an liquid crystal panel of a mobile terminal according to the present disclosure.

The present disclosure may define an operation mode according to the type of driving the main region 201 and extended region 202. A first mode is a mode in which both the main region and extended region (201, 202) are in an active state, and a second mode is a mode in which only the extended region 202 is in an active state.

As illustrated in FIG. 6, in the first mode, the drive IC transmits a gate signal (GATE), a multiplexer signal (MUX) and a data signal (DATA) to the liquid crystal panel to activate both the main region and extended region. The gate signal performs the role of determining a threshold voltage of a thin film transistor (FET) for each pixel. Accordingly, a data voltage above a predetermined voltage should be applied to the gate to change the alignment of liquid crystal molecules so as to display an image.

A multiplexer is disposed between the drive IC and each transistor. The gate signal (GATE) and data signal (DATA) are transferred through the multiplexer, and the transferred signals (GATE, DATA) are sequentially redistributed ad supplied to each transistor.

The gate signal is comprised of a gate clock and a shift-resistor, and the shift-resistor performs the operation of receiving a clock to transfer data to the next gate. The data signal is a signal for driving the liquid crystal panel according to color information for each pixel, and a voltage larger than that of the gate signal is applied to a portion at which the alignment of liquid crystal molecules should be changed to transmit light supplied from the backlight unit in a front direction.

On the other hand, as illustrated in FIG. 7, in the second mode, the drive IC transfers only the gate signal (GATE), multiplexer signal (MUX) and data signal (DATA) corresponding to the extended region 202 to activate only the extended region 202.

However, the gate signal (GATE) should be applied even to the main region 201 for synchronization at predetermined intervals. However, since the data signal is not applied to the main region 201, the size of the gate signal may be set to a small value. For example, a gate signal of ±9 V may be used for the extended region 202, and a gate signal of ±5 V may be used for the main region 201 to change the alignment of liquid crystal molecules.

The present disclosure may provide a method of selectively activating a main region (screen) and an extended region (screen) on the display unit 200 in an inactive state (off state) through a touch input to link a content displayed in the main region and extended region.

The touch input is a touch of consecutively tapping a predetermined region within a reference period of time, and referred to as a knock code according to the present disclosure. The knock code is a dedicated code for activating the main region and extended region.

A user may apply a predetermined touch input (e.g., short touch input) prior to entering a knock code to activate a touch screen on the main region and extended region.

When a knock code is entered, the controller 180 may compare it with a preset knock code to release screen lock while at the same time turning on a liquid crystal panel (e.g., LCD) of the entered region (main region or extended region).

Hereinafter, embodiments related to a control method which can be implemented in the mobile terminal will be explained in more detail with reference to the attached drawings. It is obvious to those skilled in the art that the present features can be embodied in several forms without departing from the characteristics thereof.

Furthermore, hereinafter, according to the present disclosure, the main region 201 will be referred to as a "first region", and the extended region 202 extended and formed in at least one direction of the main region will be referred to as a "second region."

Figure 8:
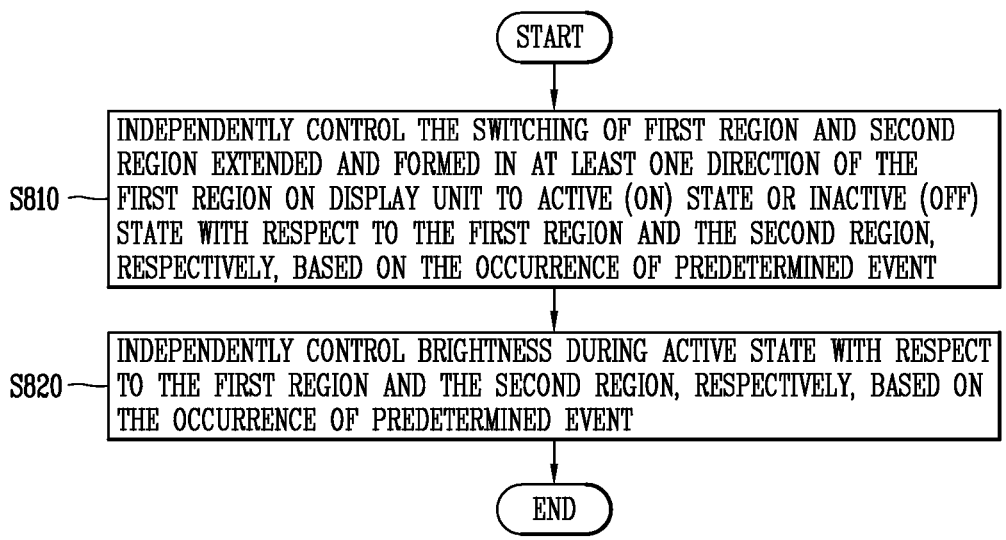
FIG. 8 is a flow chart for explaining a control method of a mobile terminal according to the present disclosure.

FIG. 8 is a flow chart for explaining a control method of a mobile terminal according to the present disclosure.

Referring to FIG. 8, first, the process (S810) of independently controlling the switching of a first region 201 and a second region 202 extended and formed in at least one direction of the first region 201 on the display unit 200 to an active (on) state or inactive (off) state with respect to the first region 201 and the second region 202, respectively, based on the occurrence of a predetermined event is carried out.

Subsequently, the process (S820) of independently controlling brightness during an active state with respect to the first region 201 and the second region 202, respectively, based on the occurrence of a predetermined event is carried out.

The predetermined event during each process may include a user's touch input applied to the display unit 200, an execution of a predetermined application, a user's touch input applied in a state that a predetermined screen is displayed, and the like.

Hereinafter, a specific embodiment will be described.

According to an embodiment, the process S810 may include displaying a screen for lock release in the first region 201 based on a consecutively knocking touch input applied to the first region 201 within a predetermined period of time when the first region 201 and the second region 202 are in an inactive state.

According to another embodiment, the process S810 may include displaying a screen for controlling an application being executed in the second region 202 based on a predetermined touch input applied to the first region 201 when the first region 201 and the second region 202 are in an inactive state.

According to another embodiment, the process S810 may include switching an inactive state of the region to an active state based on a predetermined touch input applied to the region in the inactive state when one region of the first region 201 and the second region 202 is in an inactive state and the remaining region is in an active state.

According to another embodiment, the process S820 may include decreasing the brightness of the first region 201 to a predetermined level and increasing the brightness of the second region 202 to a predetermined level based on a touch input for controlling the execution of an application applied to the second region 202 in a state that an execution screen of the application is displayed in the first region 201 and a screen for controlling the execution of the application is displayed in the second region 202.

According to another embodiment, the process S820 may include displaying an execution screen of a predetermined application in the first region 201 in which the brightness is increased to a predetermined level, and displaying a screen for controlling the execution of the predetermined application in the second region 202 in which the brightness is decreased to a predetermined level based on the application of a user input for executing the predetermined application.

According to another embodiment, the process S820 may include displaying an execution screen of an application corresponding to an icon to which a predetermined touch input is applied in the first region 201 based on the touch input applied to one of icons corresponding to a plurality of applications displayed in the second region 202.

According to another embodiment, the process S820 may include adjusting the brightness of the first region 201 to a brightness at a predetermined level in response to the executed application.

Hereinafter, a specific embodiment will be described in the aspect of constituent elements.

The display unit 200 may include a first region 201 disposed on a front surface of a body having the front surface, a lateral surface and a rear surface, and a second region 202 extended and formed in at least one direction of the first region 210.

The controller 180 may independently control the switching of the first region 201 and the second region 202 to an active (on) state or inactive (off) state with respect to the first region 201 and the second region 202, respectively, based on the occurrence of a predetermined event.

Furthermore, the controller 180 may independently control brightness during an active state with respect to the first region 201 and the second region 202, respectively, based on the occurrence of a predetermined event.

According to an embodiment, the controller 180 may display a screen for lock release in at least one region of the first region 201 and the second region 202 based on a predetermined touch applied to at least one region of the first region 201 and the second region 202 when the first region 201 and the second region 202 are in an inactive state.

According to another embodiment, the controller 180 may display a screen for lock release in the first region 201 based on a consecutively knocking touch input applied to the first region 201 within a predetermined period of time when the first region 201 and the second region 202 are in an inactive state.

According to another embodiment, the controller 180 may display a screen for controlling an application being executed in the second region 202 based on a predetermined touch input applied to the first region 201 when the first region 201 and the second region 202 are in an inactive state.

According to another embodiment, when one region of the first region 201 and the second region 202 is in an inactive state and the remaining region is in an active state, the controller switches an inactive state of the region to an active state based on a predetermined touch input applied to the region in the inactive state.

According to another embodiment, the controller 180 may switch a region set to be preferentially changed by a user on the first region 201 and the second region 202 to an active state based on a consecutively knocking touch input applied to at least one region of the first region 201 and the second region 202 within a predetermined period of time when the first region 201 and the second region 202 are in an inactive state, and switch the remaining region in an inactive state to an active state based on a consecutively knocking touch input applied again to at least one region of the first region 201 and the second region 202 within a predetermined period of time.

According to another embodiment, the controller 180 may switch a region set to be preferentially changed by a user on the first region 201 and the second region 202 to an inactive state based on a user input not being applied within a predetermined period of time when the first region 201 and the second region 202 are in an active state, and switch the remaining region in an active state to an inactive state based on a user input not being applied within a predetermined period of time.

According to another embodiment, the controller 180 may decrease the brightness of the first region 201 to a predetermined level and increase the brightness of the second region 202 to a predetermined level based on a touch input for controlling the execution of an application applied to the second region 202 in a state that an execution screen of the application is displayed in the first region 201 and a screen for controlling the execution of the application is displayed in the second region 202.

According to another embodiment, the controller 180 may display an execution screen of a predetermined application in the first region 201 in which the brightness is increased to a predetermined level, and display a screen for controlling the execution of the predetermined application in the second region 202 in which the brightness is decreased to a predetermined level based on the application of a user input for executing the predetermined application.

According to another embodiment, the controller 180 may increase the brightness of the second region 202 to a predetermined level based on a touch input for controlling the execution of the predetermined application applied to the second region 202.

According to another embodiment, the controller 180 may display an execution screen of an application corresponding to an icon to which a predetermined touch input is applied in the first region 201 based on the touch input applied to one of icons corresponding to a plurality of applications displayed in the second region 202.

According to another embodiment, the controller 180 may adjust the brightness of the first region 201 to a brightness at a predetermined level in response to the executed application.

As described above, the controller 180 may display a screen for lock release in at least one region of the first region 201 and the second region 202 based on a predetermined touch applied to at least one region of the first region 201 and the second region 202 when the first region 201 and the second region 202 are in an inactive state.

According to another embodiment, the controller 180 may display a screen for lock release in the first region 201 based on a consecutively knocking touch input applied to the first region 201 within a predetermined period of time when the first region 201 and the second region 202 are in an inactive state.

Figure 9:
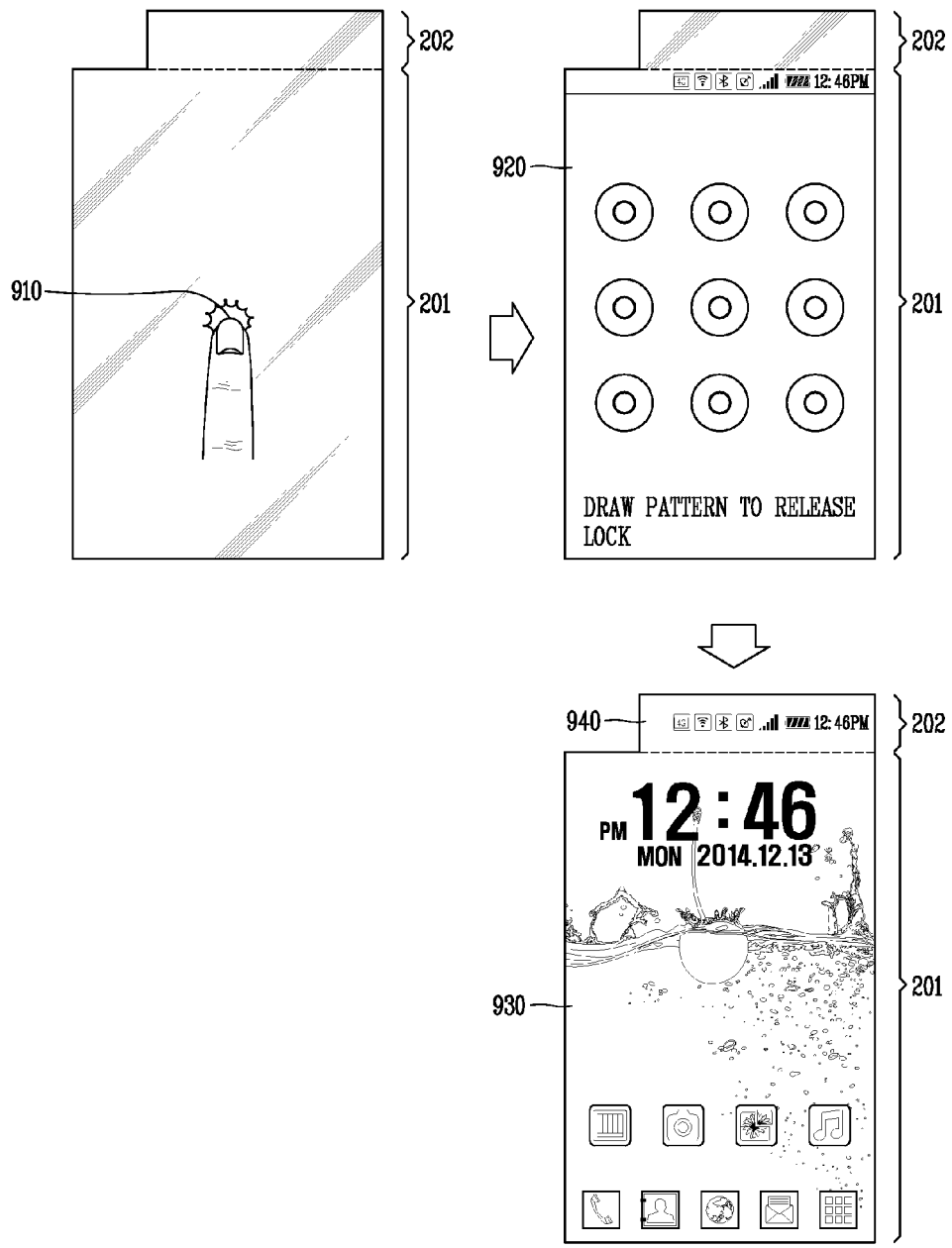
FIG. 9 is a conceptual view for explaining an embodiment of displaying a screen for lock release when a knock code is entered while a main region and an extended region are both in an inactive state.

FIG. 9 is a conceptual view for explaining an embodiment of displaying a screen for lock release when a knock code is entered while a main region and an extended region are both in an inactive state.

Referring to FIG. 9, a consecutively knocking touch input 910 may be applied to the first region 201 within a short period of time in a state that the first region 201 and the second region 202 are in an inactive state.

Accordingly, the first region 201 may be switched to an active state to display a pattern input screen 920 for lock release. According to an embodiment, a screen corresponding to a lock setting mode may be displayed. For example, a screen capable of entering a fingerprint, a password or the like may be displayed.

At this time, the second region 202 may maintain an inactive state, and may be switched to an active state to display the status information of the terminal.

Subsequently, when a predetermined pattern is entered by a user, lock setting may be released to display a home screen 930 in the first region 201. Furthermore, the status information 940 of the terminal may be displayed in the second region 202.

According to another embodiment, when a predetermined pattern is entered by a user, a screen being displayed prior to switching to an inactive state may be displayed in the first region 201 and the second region 202.

Specifically, when the first region 201 and the second region 202 have been switched to an inactive state since there is no user input for a predetermined period of time in a state that an execution screen of a messenger application is being displayed, the execution screen of the messenger application may be displayed again in the first region 201. Furthermore, the status information 940 of the terminal may be displayed in the second region 202.

Figure 10:
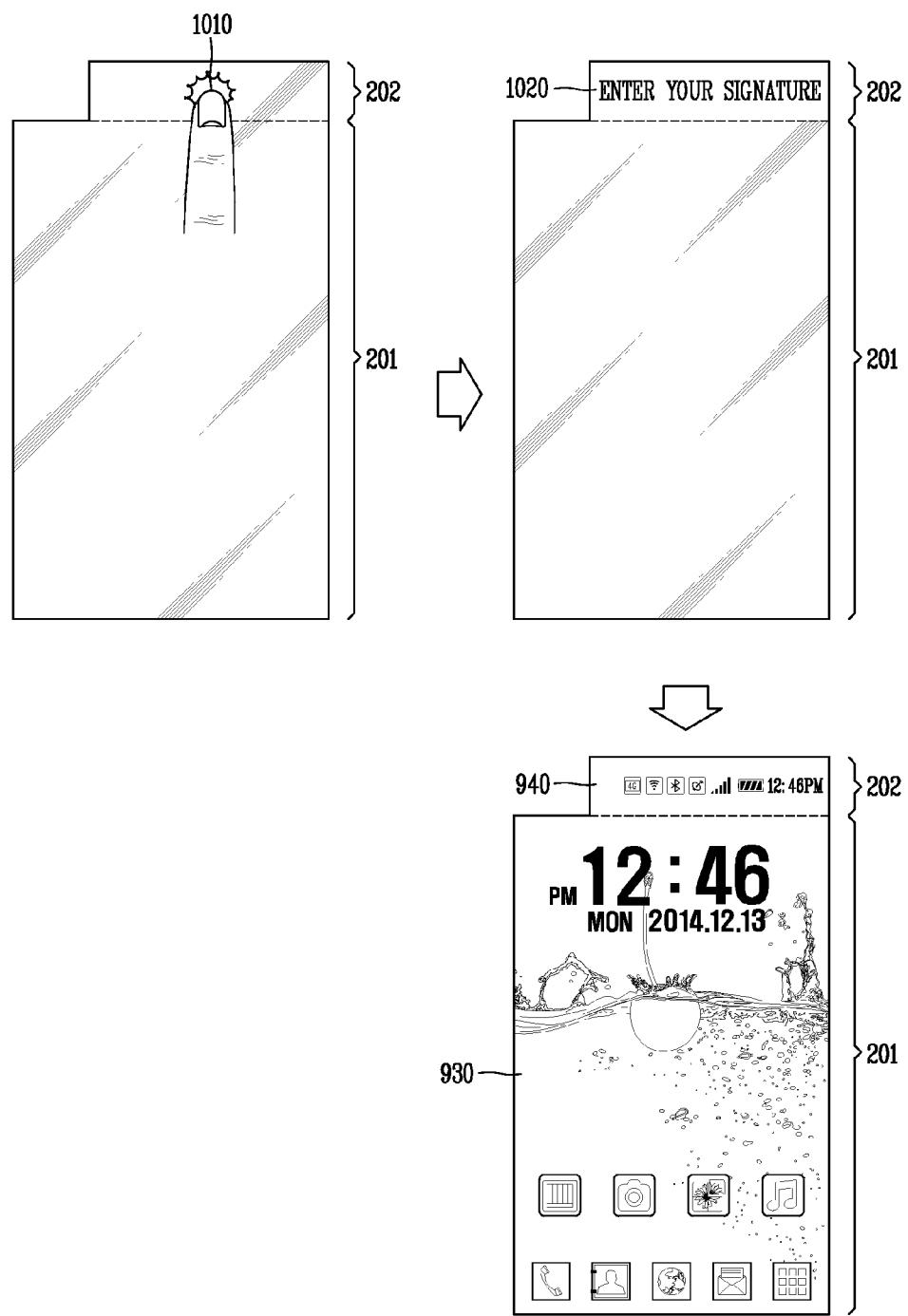
FIG. 10 is a conceptual view for explaining another embodiment of displaying a screen for lock release when a knock code is entered while a main region and an extended region are both in an inactive state.

FIG. 10 is a conceptual view for explaining another embodiment of displaying a screen for lock release when a knock code is entered while a main region and an extended region are both in an inactive state.

Referring to FIG. 10, a consecutively knocking touch input may be applied to the second region 202 within a short period of time in a state that the first region 201 and the second region 202 are in an inactive state.

Accordingly, the second region 202 may be switched to an active state to display a signature input screen 1020 for lock release. According to an embodiment, a screen corresponding to a lock setting mode may be displayed. For example, a screen capable of entering a fingerprint, a password or the like may be displayed.

Subsequently, when a predetermined signature is entered by a user, lock setting may be released to display a home screen 930 in the first region 201. Furthermore, the status information 940 of the terminal may be displayed in the second region 202.

According to another embodiment, when a signature is entered by a user, a screen being displayed prior to switching to an inactive state may be displayed in the first region 201 and the second region 202.

Specifically, an execution screen of a music application may be displayed in the first region 201, and a control pad screen for music playback may be displayed in the second region 202. At this time, when the first region 201 and the second region 202 have been switched to an inactive state since there is no user input for a predetermined period of time, the execution screen and control pad screen of the music application may be displayed again in the first region 201 and the second region 202, respectively.

On the other hand, the controller 180 may display a screen for controlling an application being executed in the second region 202 based on a predetermined touch input applied to the first region 201 while the first region 201 and the second region 202 are in an inactive state.

Figure 11:
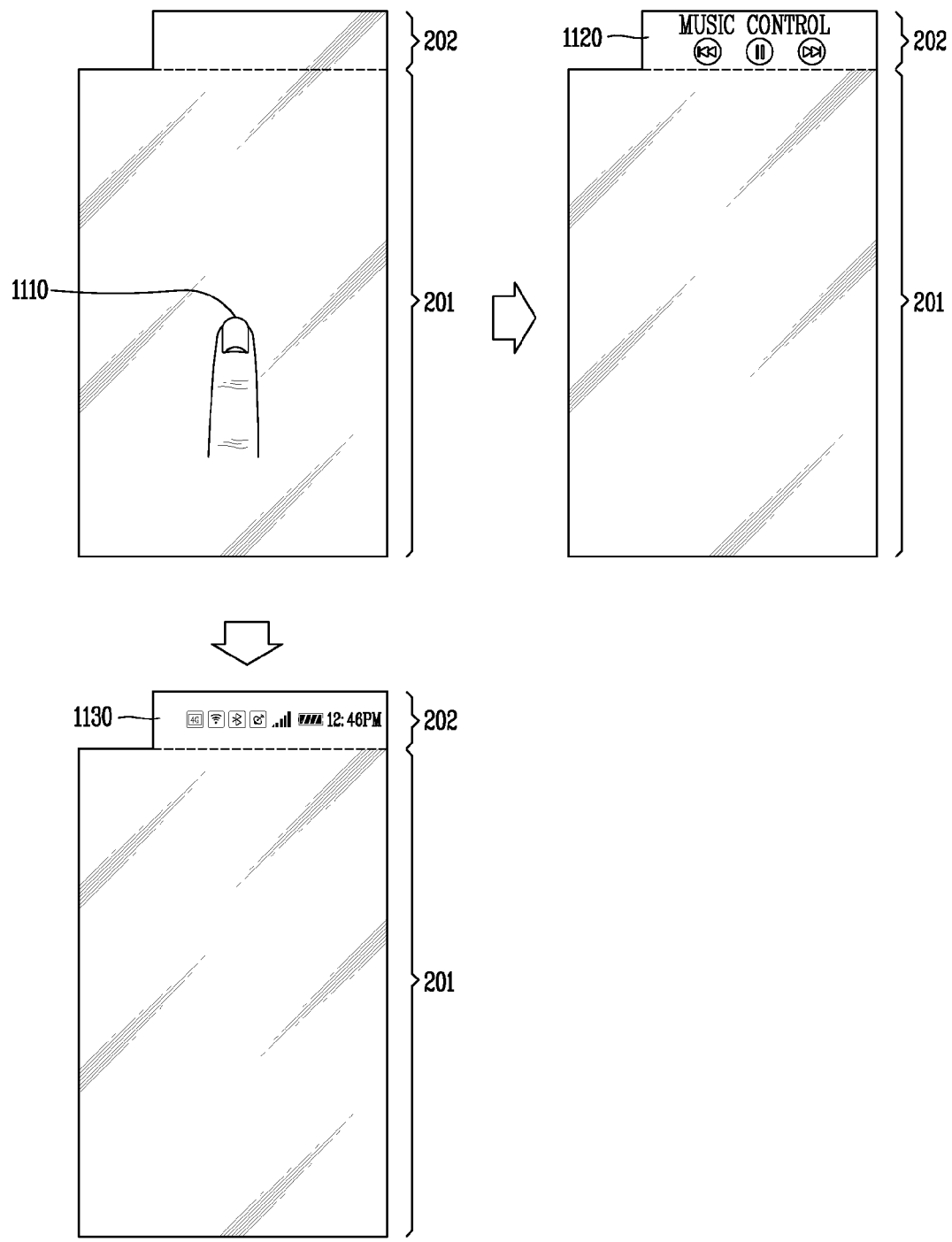
FIG. 11 is a conceptual view for explaining an embodiment of displaying a screen for controlling an application being executed when a predetermined touch is entered while a main region and an extended region are both in an inactive state.

FIG. 11 is a conceptual view for explaining an embodiment of displaying a screen for controlling an application being executed when a predetermined touch is entered while a main region and an extended region are both in an inactive state.

Referring to FIG. 11, a short touch input 1110 may be applied to the first region 201 while the first region 201 and the second region 202 are in an inactive state.

Accordingly, when a music application is being executed, the second region 202 may be switched to an active state to display a control pad screen 1120 capable of controlling music playback.

According to another embodiment, when there exists no application being executed, the second region 202 may be switched to an active state to display the status information 1130 of the terminal.

According to another embodiment, information sensed on an illuminance sensor may be taken into consideration during screen status switching. As a result, it may be possible to prevent a touch input from being accidentally applied within a bag or pocket to switch the status thereof to an active state.

When the embodiment of FIG. 11 is compared with the embodiment of FIG. 9, a different control operation may be carried out according to the type of a touch input.

Specifically, when a short touch input is applied, only the extended region 202 may be switched to an active state to display the status information of a screen or terminal associated with an application being executed. On the contrary, when a consecutively knocking touch within a short period of time (knock code input) is applied, the main region 201 may be switched to an active state to display a screen for lock release.

On the other hand, when one region of the first region 201 and the second region 202 is in an inactive state and the remaining region is in an active state, the controller 180 may switch an inactive state of the region to an active state based on a predetermined touch input applied to a region in the inactive state.

Figure 12:
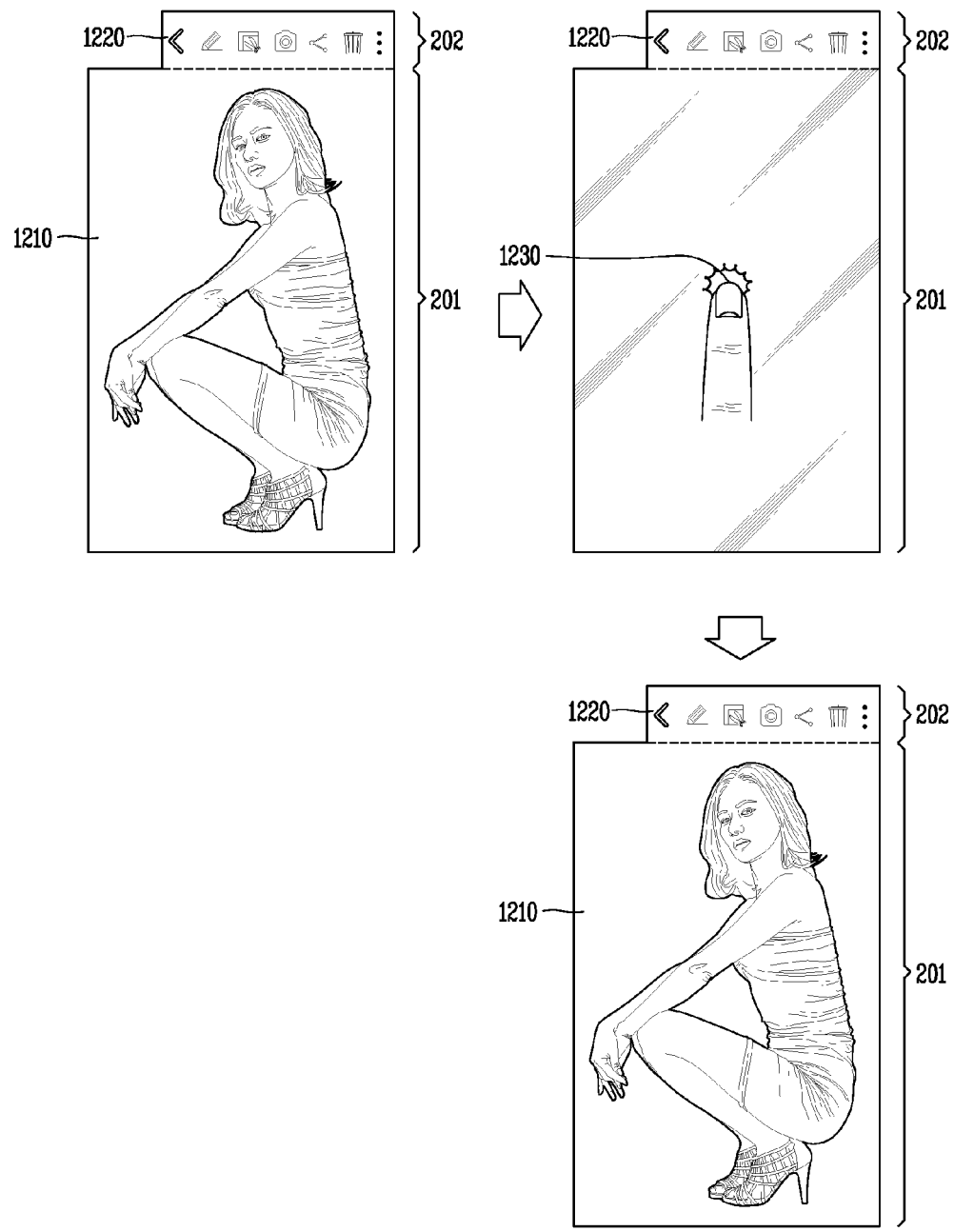
FIG. 12 is a conceptual view for explaining an embodiment of displaying a previous execution screen again when a knock code is entered while at least one region is in an active state.

FIG. 12 is a conceptual view for explaining an embodiment of displaying a previous execution screen again when a knock code is entered while at least one region is in an active state.

Referring to FIG. 12, a photo gallery application may be carried out to display a photo image 1210 in the first region 201 and display an image edit tool 1220 in the second region 202.

When a user input is not applied for a predetermined period of time in this state, the first region 201 may be switched to an inactive state. Subsequently, when a consecutively knocking touch input 1230 is applied to the first region 201 that has been switched to an inactive state within a short period of time, it may be switched to an active state to redisplay a photo image 1210 that has been previously displayed.

When the embodiment of FIG. 12 is compared to the embodiment of FIG. 9, a different control operation may be carried out according to the active or inactive state of the screen.

Specifically, when a knock code is entered while the main region 201 and the extended region 202 are both in an inactive state, a screen for lock release may be displayed. On the contrary, when a knock code is entered while only the main region 201 is in an inactive state, a screen that has been previously displayed may be displayed again.

In other words, when a knock code is entered in an active state of the extended region 202, a screen that has been previously displayed may be displayed again to follow a previous use in the main region 201.

On the other hand, the controller 180 may switch a region set to be preferentially changed by a user on the first region 201 and the second region 202 to an active state based on a consecutively knocking touch input applied to at least one region of the first region 201 and the second region 202 within a predetermined period of time when the first region 201 and the second region 202 are in an inactive state, and switch the remaining region in an active state to an inactive state based on a consecutively knocking touch input applied again to at least one region of the first region 201 and the second region 202 within a predetermined period of time.

According to another embodiment, the controller 180 may switch a region set to be preferentially changed by a user on the first region 201 and the second region 202 to an inactive state based on a user input not being applied within a predetermined period of time when the first region 201 and the second region 202 are in an active state, and switch the remaining region in an active state to an inactive state based on a user input not being applied within a predetermined period of time.

Figure 13:
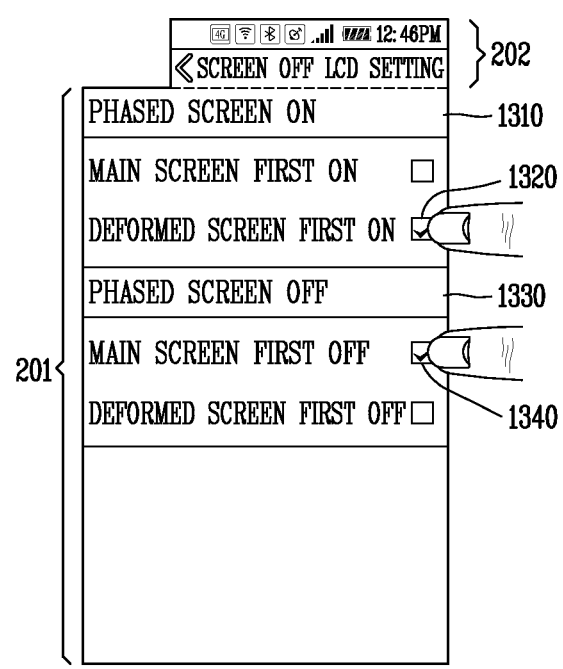
FIG. 13 is a conceptual view for explaining an embodiment of setting a sequence of switching the main region and extended region to an active state or inactive state.

FIG. 13 is a conceptual view for explaining an embodiment of setting a sequence of switching the main region and extended region to an active state or inactive state.

Referring to FIG. 13, a screen capable of setting a sequence of switching the first region 201 and the second region 202 to an active or inactive state may be displayed.

Specifically, when a touch input is applied to a check box 1320 for preferentially turning on the second region 202 on a menu 1310 of setting a sequence of turning on the screen, a check indicator is displayed on the check box 1320.

Furthermore, when a touch input is applied to a check box 1340 for preferentially turning off the first region 201 on a menu 1330 of setting a sequence of turning off the screen, a check indicator is displayed on the check box 1340.

Figure 14:
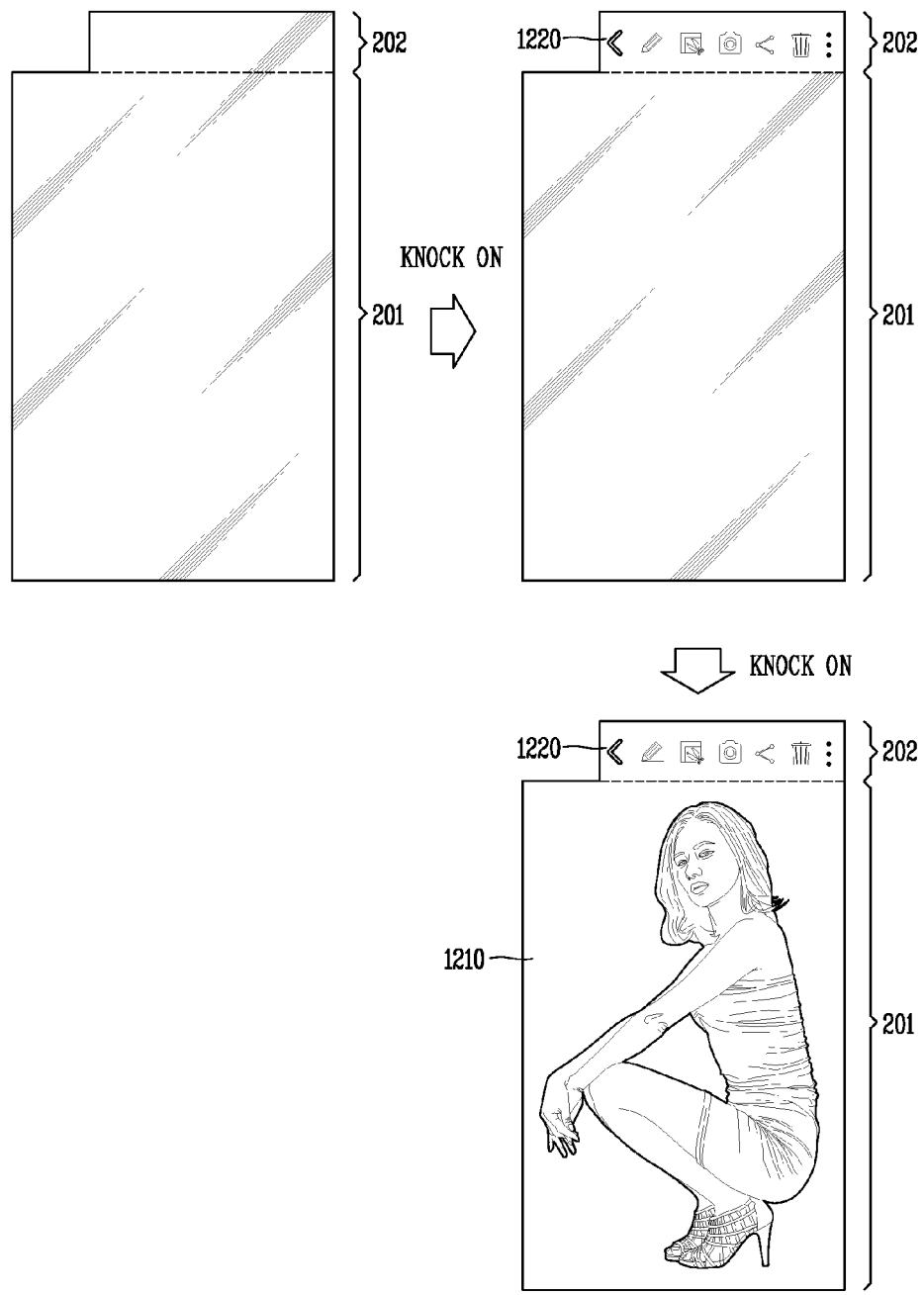
FIG. 14 is a conceptual view for explaining an embodiment of switching from an inactive state to an active state according to a sequence set in FIG. 13.

FIG. 14 is a conceptual view for explaining an embodiment of switching from an inactive state to an active state according to a sequence set in FIG. 13.

Referring to FIG. 14, when a user input is not applied for a predetermined period of time in a state that a photo gallery application is executed to display a photo image in the first region 201 and display an image edit tool in the second region 202 (refer to FIG. 12), the first region 201 and the second region 202 may be switched to an inactive state.

Subsequently, when a consecutively knocking touch input is applied to the first region 201 or second region 202 within a short period of time, the second region 202 set to preferentially turn on the screen in FIG. 13 may be first switched to an active state to display the image edit tool 1220 again.

Furthermore, when a consecutively knocking touch input is applied again to the first region 201 or second region 202 within a short period of time, the first region 201 may be also switched to an active state to display the photo image 1210 again.

According to another embodiment, in case where the first region 201 is set to preferentially turn on the screen in FIG. 13, when a consecutively knocking touch input is applied to the first region 201 or second region 202 within a short period of time, the first region 201 may be first switched to an active state to display the photo image 1210 again.

Subsequently, when a consecutively knocking touch input is applied again to the first region 201 or second region 202 within a short period of time, the second region 202 may be also switched to an active state to display the image edit tool 1220 again.

According to the embodiment of FIG. 14, in case where the second region 202 is set to preferentially turn on the screen even when a knock code input is applied to the first region 201, the second region 202 may be switched to an active state. Similarly, in case where the first region 201 is set to preferentially turn on the screen even when a knock code input is applied to the second region 202, the first region 201 may be switched to an active state.

Figure 15:
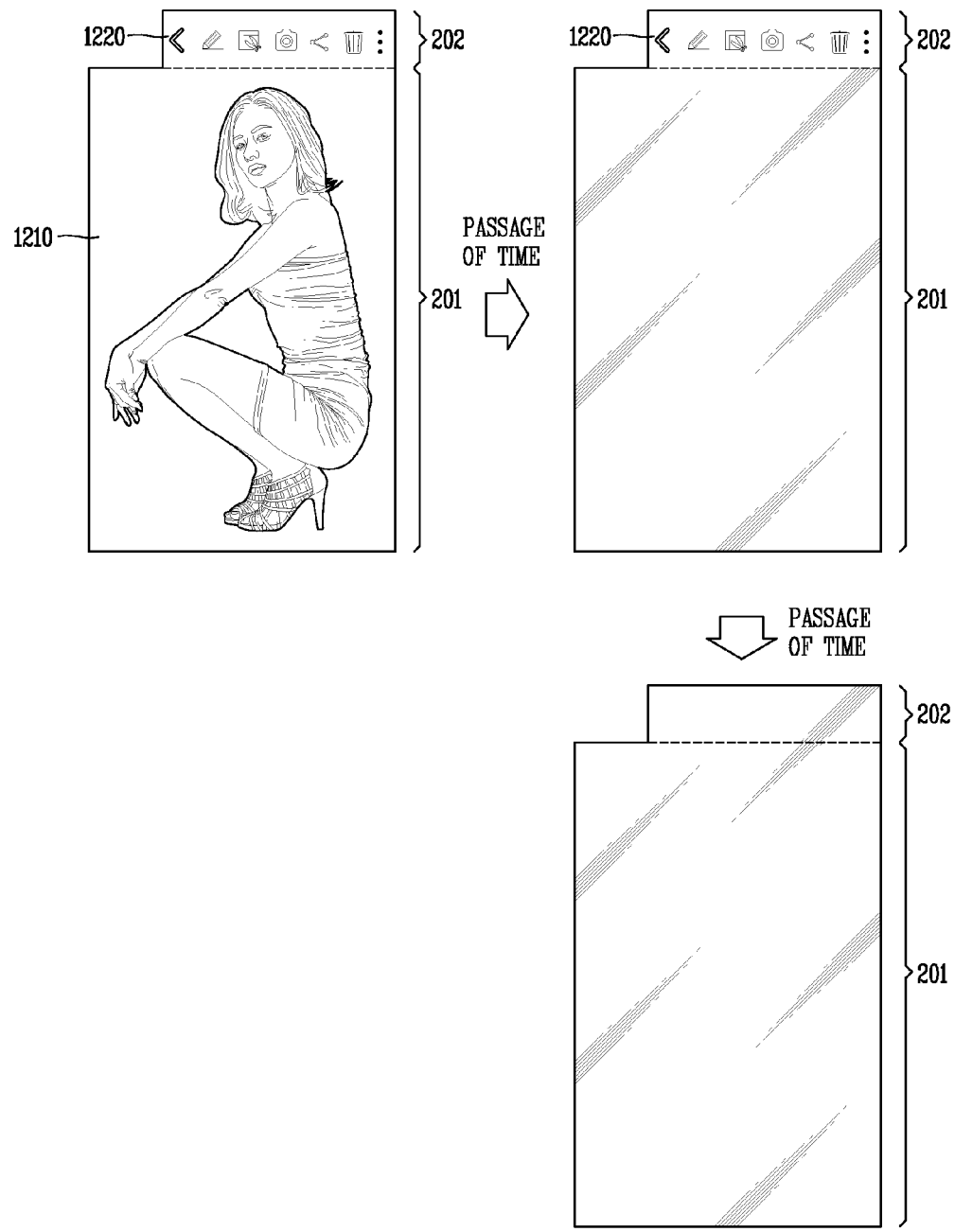
FIG. 15 is a conceptual view for explaining an embodiment of switching from an active state to an inactive state according to a sequence set in FIG. 13.

FIG. 15 is a conceptual view for explaining an embodiment of switching from an active state to an inactive state according to a sequence set in FIG. 13.

Referring to FIG. 15, a photo gallery application may be executed to display a photo image 1210 in the first region 201 and display an image edit tool 1220 in the second region 202.

When a user input is not applied for a predetermined period of time in this state, the first region 201 set to preferentially turn off the screen in FIG. 13 may be first switched to an inactive state.

Subsequently, when a user input is not yet applied for a predetermined period of time, the second region 202 may be also switched to an inactive state.

According to another embodiment, when a user input is not applied for a predetermined period of time in case where the second region 202 is set to preferentially turn off the screen in FIG. 13, the second region 202 may be first switched to an inactive state.

Subsequently, when a user input is not yet applied for a predetermined period of time, the first region 201 may be also switched to an inactive state.

According to another embodiment, a period of time for which a user input for switching to an inactive state is not applied may be set in a similar or different manner for each process.

Specifically, when a user input is not applied for 2 minutes, the first region 201 set to preferentially turn off the screen in FIG. 13 may be first switched to an inactive state. Subsequently, when the user input is not yet applied for 3 minutes, the second region 202 may be also switched to an inactive state.

On the other hand, the controller 180 may decrease the brightness of the first region 201 to a predetermined level and increase the brightness of the second region 202 to a predetermined level based on a touch input for controlling the execution of an application applied to the second region 202 in a state that an execution screen of the application is displayed in the first region 201 and a screen for controlling the execution of the application is displayed in the second region 202.

Figure 16:
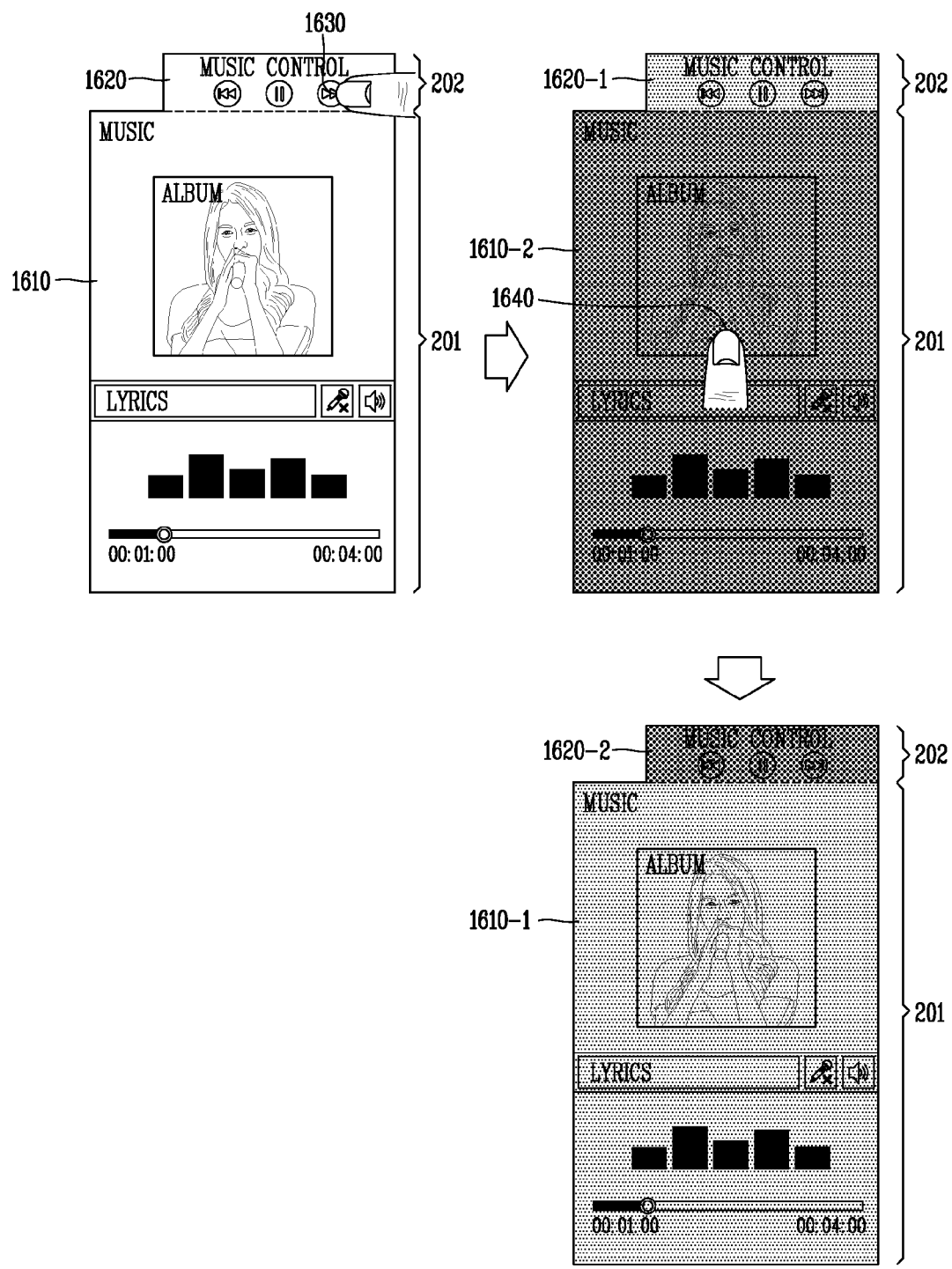
FIG. 16 is a conceptual view for explaining an embodiment of adjusting the brightness of the main region and extended region in a state that a screen for controlling an application being executed is displayed in the extended region.

FIG. 16 is a conceptual view for explaining an embodiment of adjusting the brightness of the main region and extended region in a state that a screen for controlling an application being executed is displayed in the extended region.

Referring to FIG. 16, when a music playback application is carried out, an execution screen 1610 of the music playback application is displayed in the first region 201, and a control pad screen 1620 of music playback may be displayed in the second region 202.

At this time, when a touch input 1630 for controlling music playback is applied to the control pad screen 1620 of music playback, the brightness of the first region 201 may be decreased and the brightness of the second region 202 may be increased.

Specifically, the execution screen 1610-2 of the music playback application on which the brightness is decreased to a predetermined level may be displayed in the first region 201. Furthermore, the control pad screen 1620-1 of music playback on which the brightness is increased to a predetermined level may be displayed in the second region 202.

In other words, the brightness of a used region to which a user's manipulation is currently applied may be set to high and the brightness of a non-used region may be set to low to reduce unnecessary power consumption.

Subsequently, when a touch input 1640 is applied to the execution screen 1610-2 of the music playback application with a low brightness, the brightness of the first region 201 may be increased and the brightness of the second region 202 may be decreased.

Specifically, the execution screen 1610-2 of the music playback application on which the brightness is decreased to a predetermined level may be displayed in the first region 201. Furthermore, the control pad screen 1620-1 of music playback on which the brightness is increased to a predetermined level may be displayed in the second region 202.

According to another embodiment, when a touch input is applied to the execution screen 1610-2 of the music playback application with a low brightness, the brightness of the first region 201 and the second region 202 may return to an initial state.

As described above, a predetermined period of time may pass without any user input in a state that the execution screen 1610-2 of the music playback application with a low brightness is displayed in the first region 201, and the control pad screen 1620-1 of music playback with a high brightness is displayed in the second region 202 by a touch input 1630 for controlling the music playback.

Accordingly, the first region 201 may not temporarily sense a touch input or maintain a state in which a control operation corresponding to the sensed touch input is not executed (untouchable state). For example, the first region 201 may continuously maintain an inactive state even when a knock code is entered to the first region 201 with a low brightness. At this time, when a push input is applied to a home key or power key, the untouchable state may be released.

On the other hand, the controller 180 may display an execution screen of a predetermined application in the first region 201 in which the brightness is increased to a predetermined level, and display a screen for controlling the execution of the predetermined application in the second region 202 based on the application of a user input for executing the predetermined application.

According to another embodiment, the controller 180 may increase the brightness of the second region 202 to a predetermined level based on a touch input for controlling the predetermined application applied to the second region 202.

Figure 17:
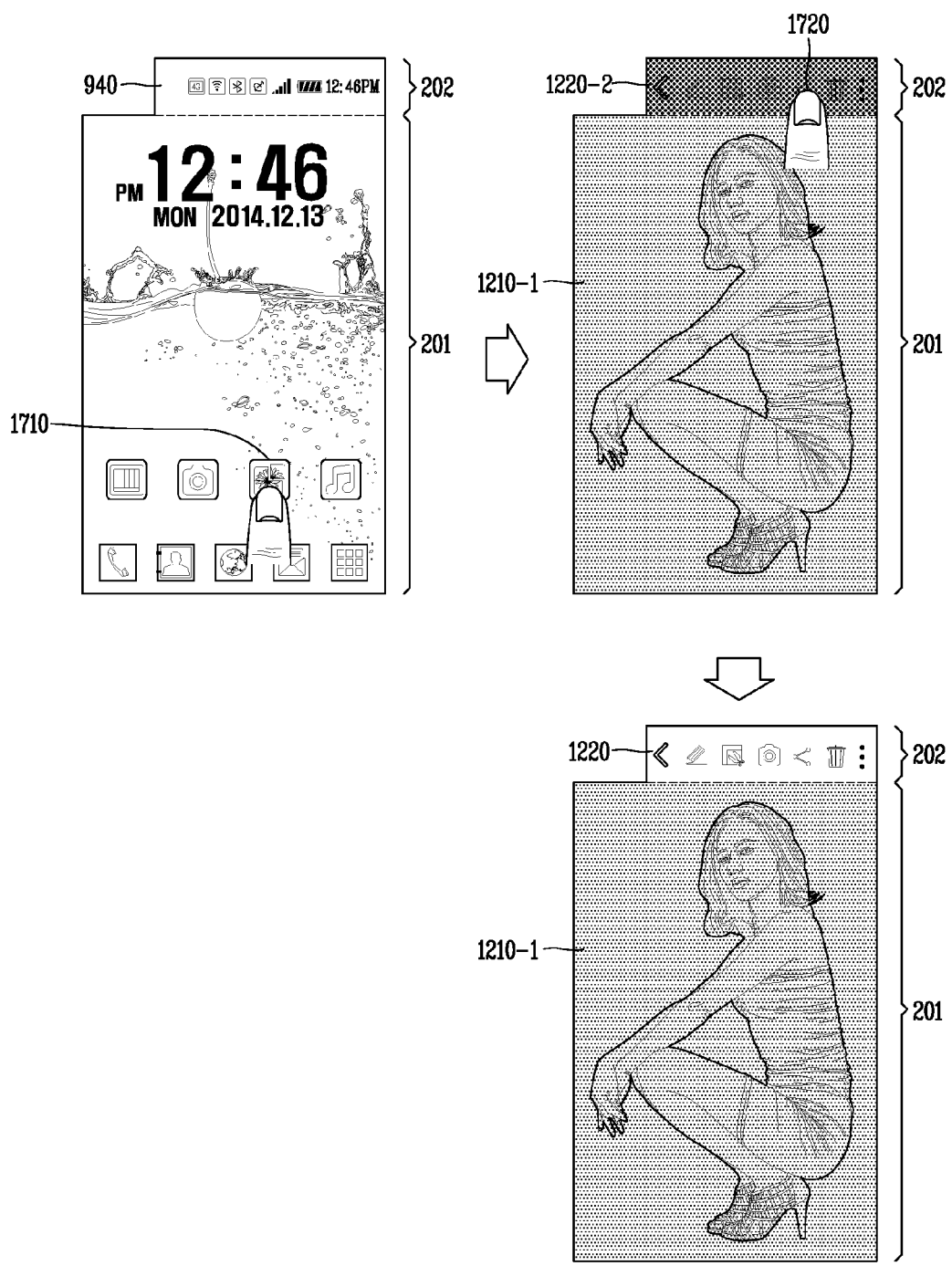
FIG. 17 is a conceptual view for explaining an embodiment of adjusting the brightness of the main region and extended region during the execution of a photo gallery application.

FIG. 17 is a conceptual view for explaining an embodiment of adjusting the brightness of the main region and extended region during the execution of a photo gallery application.

Referring to FIG. 17, in a state that a home screen is displayed in the first region 201, and the status information of a terminal is displayed in the second region 202, a touch input may be applied to an icon 1710 of a photo gallery application displayed on the home screen.

Accordingly, a photo image 1210-1 with a high brightness at a predetermined level may be displayed in the first region 201. Furthermore, an image edit tool 1220-2 with a low brightness at a predetermined level may be displayed in the second region 202.

In other words, the brightness of the main region 201 may be set to high and the brightness of the extended region 202 may be set to low during the execution of an application for aiming at viewing in the first region 201 such as a video application, a game or the like.

Subsequently, when a touch input 1720 is applied to the image edit tool 1220-2 with a low brightness, the brightness of the second region 202 may be increased again. Accordingly, an image edit tool 1220 with a high brightness at a predetermined level may be displayed.

At this time, the brightness of the first region 201 may maintain a high brightness state 1210-1 as it is, or may decrease.

On the other hand, the controller 180 may display an execution screen of an application corresponding to an icon to which a predetermined touch input is applied may be displayed in the first region 201, based on the touch input applied to one of icons corresponding to a plurality of applications displayed in the second region 202.

At this time, the controller 180 may adjust the brightness of the first region 201 to a predetermined level in response to the executed application.

In other words, an initial brightness value of the first region 201 in which an application is executed may be set in a different manner based on the type (attribute) of the executed application.

Figure 18:
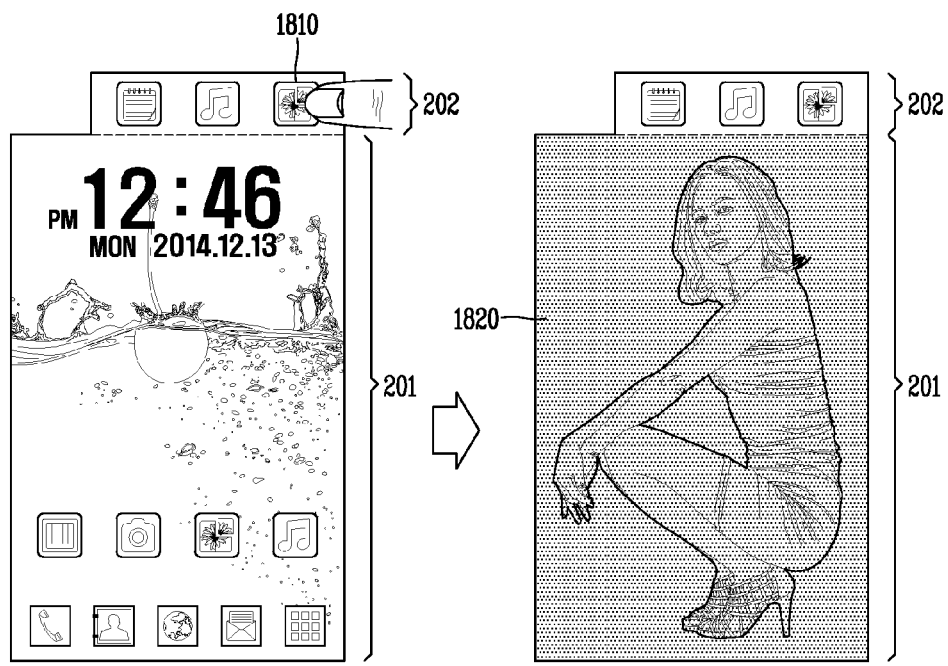
FIG. 18 is a conceptual view for explaining an embodiment of executing a photo gallery application while increasing the brightness of the main region.

FIG. 18 is a conceptual view for explaining an embodiment of executing a photo gallery application while increasing the brightness of the main region.

Referring to FIG. 18, a touch input may be applied to an icon 1810 of a photo gallery application in a state that a home screen is displayed in the first region 201, and icons corresponding to a plurality of applications are displayed in the second region 202.

Accordingly, the brightness of the first region 201 may be increased to a predetermined level with respect to the photo gallery application to display a photo image 1820.

According to another embodiment, when an application requiring the check of content displayed in the first region 201 such as camera, Internet, mail, messenger application, and the like is carried out, the brightness of the first region 201 may be set to a high brightness.

Figure 19:
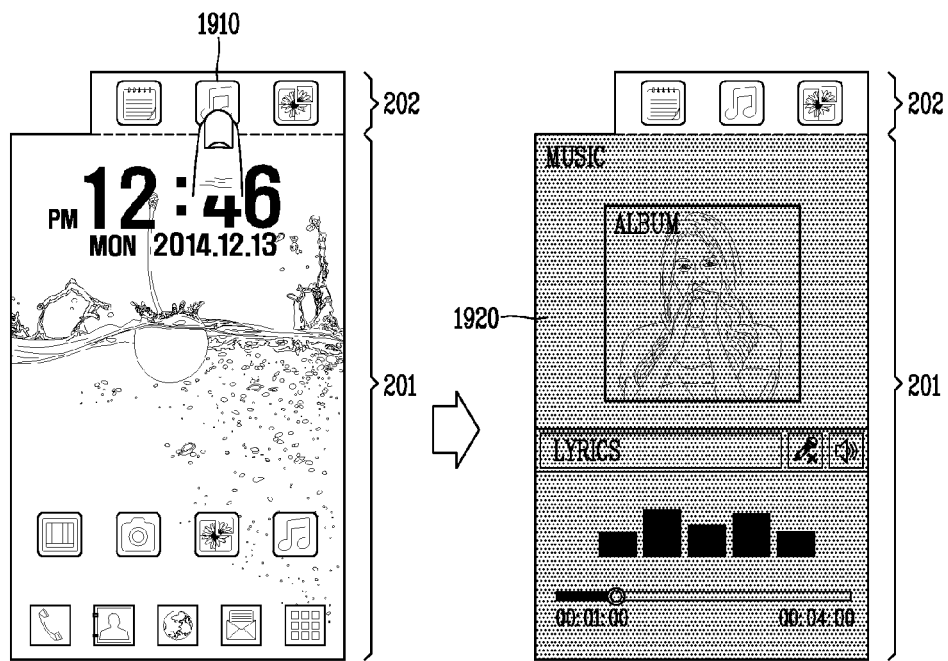
FIG. 19 is a conceptual view for explaining an embodiment of executing a photo gallery application while decreasing the brightness of the main region.

FIG. 19 is a conceptual view for explaining an embodiment of executing a photo gallery application while decreasing the brightness of the main region.

Referring to FIG. 19, a touch input may be applied to an icon 1910 of a music playback application in a state that a home screen is displayed in the first region 201, and icons corresponding to a plurality of applications are displayed in the second region 202.

Accordingly, the brightness of the first region 201 may be decreased to a predetermined level with respect to the music playback application to display an execution screen 1920 of the music playback application.

According to another embodiment, when an application requiring a low frequent check of content displayed in the first region 201 such as music playback, call, radio, voice command input and the like is carried out, the brightness of the first region 201 may be set to a low brightness. As a result, it may be possible to reduce unnecessary power consumption.

On the other hand, when a front camera mode is carried out, the second region 202 may perform a flash function.

Figure 20:
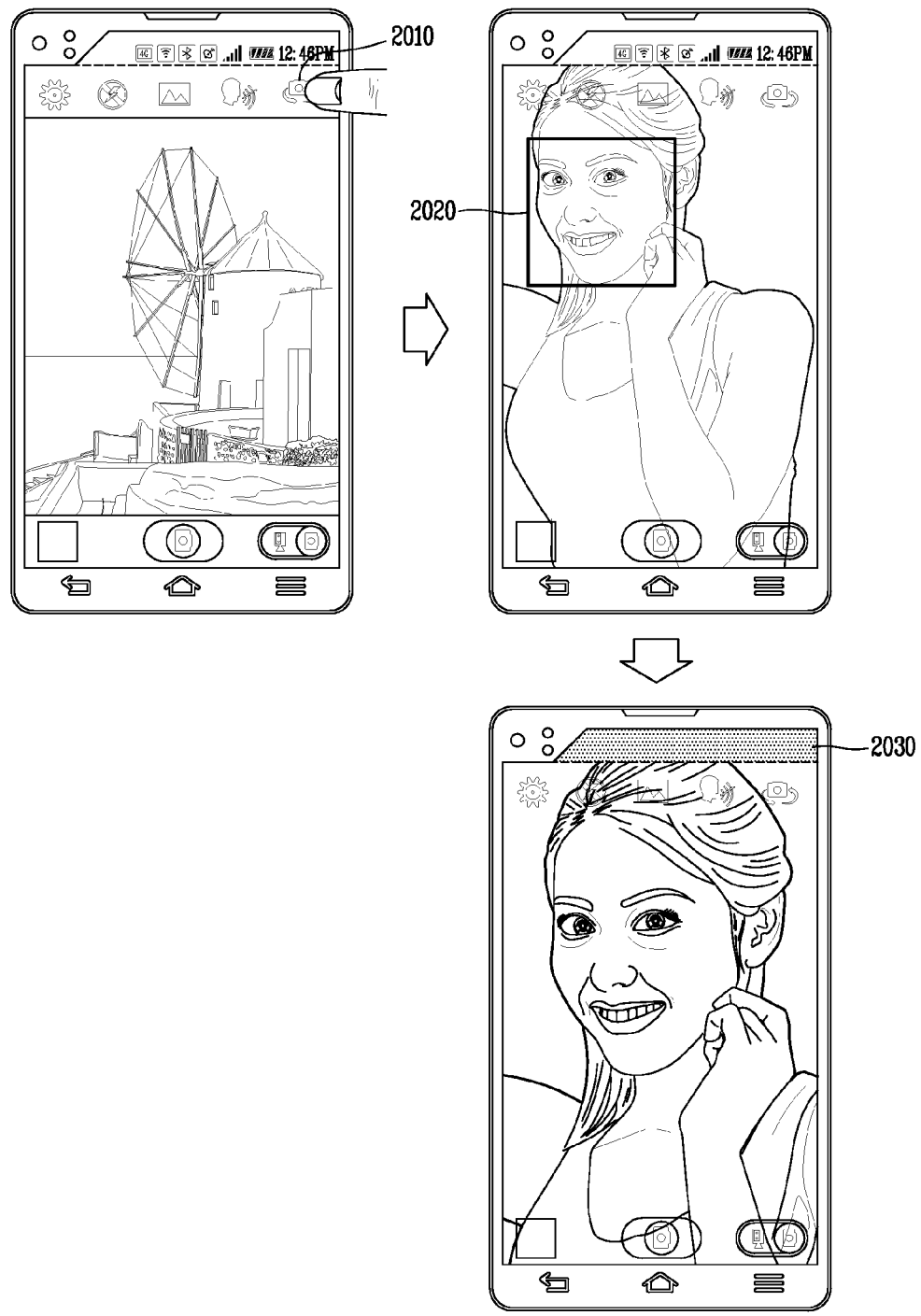
FIG. 20 is a conceptual view for explaining an embodiment of allowing an extended region to execute a flash function during the capture of a front camera.

FIG. 20 is a conceptual view for explaining an embodiment of allowing an extended region to execute a flash function during the capture of a front camera.

Referring to FIG. 20, a touch input may be applied to a front camera switch icon 2010 in a state that an execution screen of a camera application is displayed in the first region 201, and the status information of a terminal is displayed in the second region 202.

Accordingly, a face recognition frame 2020 may be displayed as being switched to a front camera to recognize a user face. Furthermore, the brightness of the second region 202 may be highly increased to a predetermined level (2030) to perform a flash function during the capture of the front camera.

The effects of a mobile terminal according to the present disclosure and a control method thereof will be described as follows.

According to at least one of the embodiments of the present disclosure, the present disclosure may provide an extended region extended from a main region to have a deformed shape from the main region, thereby having an advantage capable of extending a display region of information.

According to at least one of the embodiments of the present disclosure, the active/inactive state of the main region and extended region may be independently controlled with the understanding of the user's intention, thereby enhancing the user's convenience.

According to at least one of the embodiments of the present disclosure, the brightness of the main region and extended region may be independently controlled according to a screen content (for example, an attribute of an application or the like) displayed or touch input using a structure in which the backlight units of the main region and extended region are separated from each other.

Accordingly, a region desired to be manipulated by a user may be focused to enhance usability, and the brightness of a non-used region may be decreased to reduce the power consumption of a battery.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a display comprising a first region and a second region that extends from at least one side of the first region; and
a controller configured to:
independently switch each of the first region and the second region from either an active state to an inactive state, or from an inactive state to an active state, based on an occurrence of a first event;
independently control brightness of each of the first region and the second region when both the first region and the second region are in the active state based on an occurrence of a second event;
cause the display to display an execution screen of an application in the first region in response to a user input for executing the application, the brightness of the first region increasing from a first preset brightness level to a first predetermined brightness level in response to the user input; and
cause the display to display a screen for controlling execution of the application in the second region in response to the user input, the brightness of the second region decreasing from a second preset brightness level to a second predetermined brightness level in response to the user input,
wherein the user input is received while the first region is in the active state with the first preset brightness level and while the second region is in the active state with the second preset brightness level, and
wherein the execution screen is displayed at the first predetermined brightness level in the first region while the screen for controlling execution of the application is displayed at the second predetermined brightness level in the second region after receiving the user input, wherein the controller is further configured to set a sequence of switching the first region and the second region according to an order set by a user such that one of the first region and the second region is switched first to the active state or the inactive state before another one of the first region and the second region is switched to the active state or the inactive state according to the set sequence.

2. The mobile terminal of claim 1, wherein the controller is further configured to cause the display to display a screen for lock release in at least one of the first region or the second region in response to a first type touch applied to at least one of the first region or the second region while both the first region and the second region are in the inactive state.

3. The mobile terminal of claim 2, wherein the controller is further configured to cause the display to display the screen for lock release in the first region when the first type touch comprises consecutive tapping applied to the first region within a threshold period of time.

4. The mobile terminal of claim 2, wherein the controller is further configured to cause the display to:
display a first screen for controlling a second application in the second region in response to a second type touch applied to the first region while both the first region and the second region are in the inactive state and while the second application is executed; and
display a second screen including preset information in the second region in response to the second type touch applied to the first region while both the first region and the second region are in the inactive state and when no application is executed.

5. The mobile terminal of claim 1, wherein the controller is further configured to at least:
switch from the inactive state to the active state for the first region in response to a first touch input applied to the first region while the first region is in the inactive state and while the second region is in the active state; or
switch from the inactive state to the active state for the second region in response to a second touch input applied to the second region while the second region is in the inactive state and while the first region is in the active state.

6. The mobile terminal of claim 1, wherein the controller is further configured to:
switch one of the first region and the second region that is set to be preferentially changed by the user from the inactive state to the active state in response to first consecutive tapping applied to at least one of the first region or the second region within a first threshold period of time while both the first region and the second region are in the inactive state; and
switch the other one of the first region and the second region from the inactive state to the active state in response to second consecutive tapping applied to at least one of the first region or the second region within a second threshold period of time, the second consecutive tapping applied after the applying of first consecutive tapping.

7. The mobile terminal of claim 1, wherein the controller is further configured to:
switch one of the first region and the second region that is set to be preferentially changed by the user from the active state to the inactive state when no user input is applied within a first threshold period of time while both the first region and the second region are in the active state; and
switch the other one of the first region and the second region from the active state to the inactive state when no user input is applied within a second threshold period of time.

8. The mobile terminal of claim 1, wherein:
the controller is further configured to decrease the brightness of the first region from the first predetermined brightness level to a brightness level that is lower than the first predetermined brightness level and increase the brightness of the second region from the second predetermined brightness level to a brightness level that is higher than the second predetermined brightness level in response to a touch input for controlling execution of the application; and
the touch input is applied to the second region while the execution screen of the application is displayed in the first region at the first predetermined brightness level and while the screen for controlling execution of the application is displayed in the second region at the second predetermined brightness level.

9. The mobile terminal of claim 1, wherein when no user input is received for a predetermined period of time while both the first region and the second region are in the active state, the controller is further configured to:
switch the first region from the active state to the inactive state and then switch the second region from the active state to the inactive state when the set sequence is a first sequence; and
switch the second region from the active state to the inactive state and then switch the first region from the active state to the inactive state when the set sequence is a second sequence.

10. The mobile terminal of claim 1, wherein when a touch input is received at the first region or the second region while both the first region and the second region are in the inactive state, the controller is further configured to:
switch the first region from the inactive state to the active state and then switch the second region from the inactive state to the active state when the set sequence is a first sequence; and
switch the second region from the inactive state to the active state and then switch the first region from the inactive state to the active state when the set sequence is a second sequence.

11. The mobile terminal of claim 1, wherein the controller is further configured to increase the brightness of the second region from the second predetermined brightness level to a third predetermined brightness level in response to a touch input for controlling the execution of the application applied to the second region.

12. The mobile terminal of claim 1, wherein the controller is further configured to cause the display to:
display a plurality of icons in the second region, each of the plurality of icons corresponding to an application; and
display a second execution screen of a second application corresponding to an icon in the first region in response to a touch input applied to the icon among the plurality of icons displayed in the second region.

13. The mobile terminal of claim 12, wherein the controller is further configured to adjust the brightness of the first region to a predetermined level when the second execution screen is displayed in the first region such that brightness levels are different between the first region and the second region after the adjustment.

14. A method for controlling a mobile terminal having a display comprising a first region and a second region, the method comprising:
- independently switching each of the first region and the second regions from either an active state to an inactive state, or from an inactive state to an active state, based on an occurrence of a first event;
- independently controlling brightness of each of the first region and the second region when both the first region and the second region are in the active state based on an occurrence of a second event, wherein the second region extends from at least one side of the first region;
- receiving a user input for executing an application while the first region is in the active state with a first preset brightness level and while the second region is in the active state with a second preset brightness level;
- displaying an execution screen of the application in the first region in response to the user input, the brightness of the first region increasing from the first preset brightness level to a first predetermined brightness level in response to the user input;
- displaying a screen for controlling execution of the application in the second region in response to the user input, the brightness of the second region decreasing from the second preset brightness level to a second predetermined brightness level in response to the user input,
- wherein the execution screen is displayed at the first predetermined brightness level in the first region while the screen for controlling execution of the application is displayed at the second predetermined brightness level in the second region after receiving the user input; and
- setting a sequence of switching the first region and the second region according to an order set by a user such that one of the first region and the second region is switched first to the active state or the inactive state before another one of the first region and the second region is switched to the active state or the inactive state according to the set sequence.

15. The method of claim 14, further comprising:
displaying a screen for lock release in the first region in response to consecutive tapping applied to the first region within a threshold period of time while both the first region and the second region are in the inactive state.

16. The method of claim 14, further comprising:
- displaying a first screen for controlling a second application in the second region in response to a first touch applied to the first region while both the first region and the second region are in the inactive state and while the second application is executed; and
- displaying a second screen including preset information in the second region in response to a second touch applied to the first region while both the first region and the second region are in the inactive state and when no application is executed.

17. The method of claim 14, further comprising:
- switching from the inactive state to the active state for the first region in response to a first touch input applied to the first region while the first region is in the inactive state and while the second region is in the active state; or
- switching from the inactive state to the active state for the second region in response to a second touch input applied to the second region while the second region is in the inactive state and while the first region is in the active state.

18. The method of claim 14, further comprising:
- decreasing the brightness of the first region from the first predetermined brightness level to a brightness level that is lower than the first predetermined brightness level and increasing the brightness of the second region from the second predetermined brightness level to a brightness level that is higher than the second predetermined brightness level in response to a touch input for controlling execution of the application,
- wherein the touch input is applied to the second region while the execution screen of the application is displayed in the first region and while the screen for controlling execution of the application is displayed in the second region.

19. The method of claim 14, further comprising:
- displaying a plurality of icons in the second region, each of the plurality of icons corresponding to an application; and
- displaying a second execution screen of a second application corresponding to an icon in the first region in response to a touch input applied to the icon among the plurality of icons displayed in the second region.

20. The method of claim 19, further comprising:
adjusting the brightness of the first region to a predetermined level when the second execution screen is displayed in the first region such that brightness levels are different between the first region and the second region after the adjustment.

* * * * *